United States Patent
Liu et al.

(10) Patent No.: US 11,620,683 B2
(45) Date of Patent: *Apr. 4, 2023

(54) UTILIZING MACHINE-LEARNING MODELS TO CREATE TARGET AUDIENCES WITH CUSTOMIZED AUTO-TUNABLE REACH AND ACCURACY

(71) Applicant: Adobe Inc., San Jose, CA (US)

(72) Inventors: Lei Liu, Los Gatos, CA (US); Hunter North, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/820,346

(22) Filed: Aug. 17, 2022

(65) Prior Publication Data

US 2022/0405806 A1 Dec. 22, 2022

Related U.S. Application Data

(63) Continuation of application No. 17/152,419, filed on Jan. 19, 2021, now Pat. No. 11,481,810.

(51) Int. Cl.
*G06Q 30/02* (2023.01)
*G06Q 30/0251* (2023.01)
(Continued)

(52) U.S. Cl.
CPC ..... *G06Q 30/0269* (2013.01); *G06F 18/2148* (2023.01); *G06F 18/24323* (2023.01); *G06N 20/00* (2019.01); *G06Q 30/0204* (2013.01)

(58) Field of Classification Search
CPC ........... G06Q 30/0269; G06Q 30/0204; G06N 20/00; G06K 9/6257; G06K 9/6282
See application file for complete search history.

(56) References Cited

U.S. PATENT DOCUMENTS

| | | | |
|---|---|---|---|
| 10,373,197 B2* | 8/2019 | Jordon | G06Q 30/0254 |
| 10,460,256 B2* | 10/2019 | Amershi | G06V 10/764 |
| 2016/0189210 A1* | 6/2016 | Lacey | G06N 20/00 |
| | | | 705/7.31 |

(Continued)

OTHER PUBLICATIONS

Yang, Elsevier, 2017, pp. 347-357.*
Bonte, Elsevier, 2018, pp. 39-47.*

(Continued)

*Primary Examiner* — Michael I Ezewoko
(74) *Attorney, Agent, or Firm* — Keller Preece PLLC

(57) ABSTRACT

This disclosure describes one or more implementations of a model segmentation system that generates accurate audience segments for client devices/individuals utilizing multi-class decision tree machine-learning models. For example, in various implementations, the model segmentation system generates a customized loss penalty matrix from multiple loss penalty matrices. In particular, the model segmentation system can generate regression mappings of model evaluation metrics for a plurality of decision tree models and combine loss penalty matrices based on the regression mappings to generate a customized loss penalty matrix that best fits an administrator's customized needs of segment accuracy and reach. The model segmentation system then utilizes the customized loss penalty matrix to train a multi-class decision tree machine-learning model to classify client devices into non-overlapping audience segments. Further, in one or more implementations, the model segmentation system refines the multi-class decision tree machine-learning model based on adjusting the tree depth.

20 Claims, 12 Drawing Sheets

(51) Int. Cl.
  *G06Q 30/0204* (2023.01)
  *G06N 20/00* (2019.01)
  *G06F 18/214* (2023.01)
  *G06F 18/243* (2023.01)

(56) References Cited

U.S. PATENT DOCUMENTS

2019/0272553 A1* 9/2019 Saini .................. G06F 16/9535
2020/0357026 A1 11/2020 Liu
2021/0334667 A1* 10/2021 Huu ...................... G06N 20/20

OTHER PUBLICATIONS

Kneale, Elsevier, 2018, pp. 71-78.*
Dev, Elsevier, 2019, pp. 392-404.*
experienceleague.Adobe.com; "Recency and Frequency" Date downloaded Jan. 26, 2021; https://experienceleague.adobe.com/docs/audience-manager/user-guide/features/segments/recency-and-frequency.html?lang=en#features.
Bonte, Elsevier, "Machine learning based brain tumour segmentation on limited data using local texture and abnormality"; 2018, pp. 39-47.
Dev, Elsevier; "Formation lithology classification using scalable gradient boosted decision trees"; 2019, pp. 392-404.
Kneale, Elsevier; "Uncharted forest: A technique for exploratory data analysis"; 2018, pp. 71-78.
Yang, Elsevier; "A regression tree approach using mathematical programming"; 2017, pp. 347-357.
U.S. Appl. No. 17/152,419, filed Jul. 12, 2022, Notice of Allowance.

* cited by examiner

UTILIZING MACHINE-LEARNING MODELS TO CREATE TARGET AUDIENCES WITH CUSTOMIZED AUTO-TUNABLE REACH AND ACCURACY

CROSS-REFERENCE TO RELATED APPLICATIONS

The present application is a continuation of U.S. application Ser. No. 17/152,419, filed on Jan. 19, 2021. The aforementioned application is hereby incorporated by reference in its entirety.

BACKGROUND

Recent years have seen significant improvements in hardware and software platforms for training and utilizing machine-learning models. For instance, many machine-learning methods have achieved promising performance in areas such as intelligent selection and distribution of dynamic digital content to client devices across computing networks. Notwithstanding these improvements, conventional systems continue to suffer from several problems with regard to the accuracy, efficiency, and flexibility of computing device operations, and in particular, with respect to generating digital audience segments. For example, many conventional systems are complex, inflexible, and inefficient. In addition, many conventional systems produce inaccurate segments that have large amounts of overlap.

Accordingly, these along with additional problems and issues exist in current solutions with respect to the technical field of digital content dissemination.

BRIEF SUMMARY

Implementations of the present disclosure provide benefits and/or solve one or more of the foregoing or other problems in the art with systems, non-transitory computer-readable media, and methods that accurately and efficiently generate and utilize multi-class decision tree machine-learning models to generate multiple audience segments that have no overlap. To illustrate, in various implementations, the disclosed systems generate a multi-class decision tree machine-learning model utilizing a range of penalty loss matrices. More specifically, the disclosed systems create a customized penalty loss matrix that corresponds to several audience segments. In some embodiments, the disclosed systems generate the customized penalty loss matrix by generating regression models based on reach and accuracy metrics for a plurality of multi-class decision tree machine-learning models and segments and then combining penalty loss matrices in accordance with selected reach and accuracy metrics from the regression models for each segment. The disclosed systems then generate a multi-class decision tree machine-learning model based on the customized penalty loss matrix to finalize the model, which generates sets of rules for classifying traits of client devices into one of the audience segments. Moreover, in some implementations, the disclosed systems intelligently select a tree depth for the multi-class decision tree machine learning model to improve accuracy while avoiding overfitting. In this manner, the disclosed systems can efficiently and flexibly generate a multi-class decision tree machine-learning that accurately determines digital audience segments.

The following description sets forth additional features and advantages of one or more implementations of the disclosed systems, computer-readable media, and methods.

BRIEF DESCRIPTION OF THE DRAWINGS

The detailed description provides one or more implementations with additional specificity and detail through the use of the accompanying drawings, as briefly described below.

DETAILED DESCRIPTION

Figure 1:
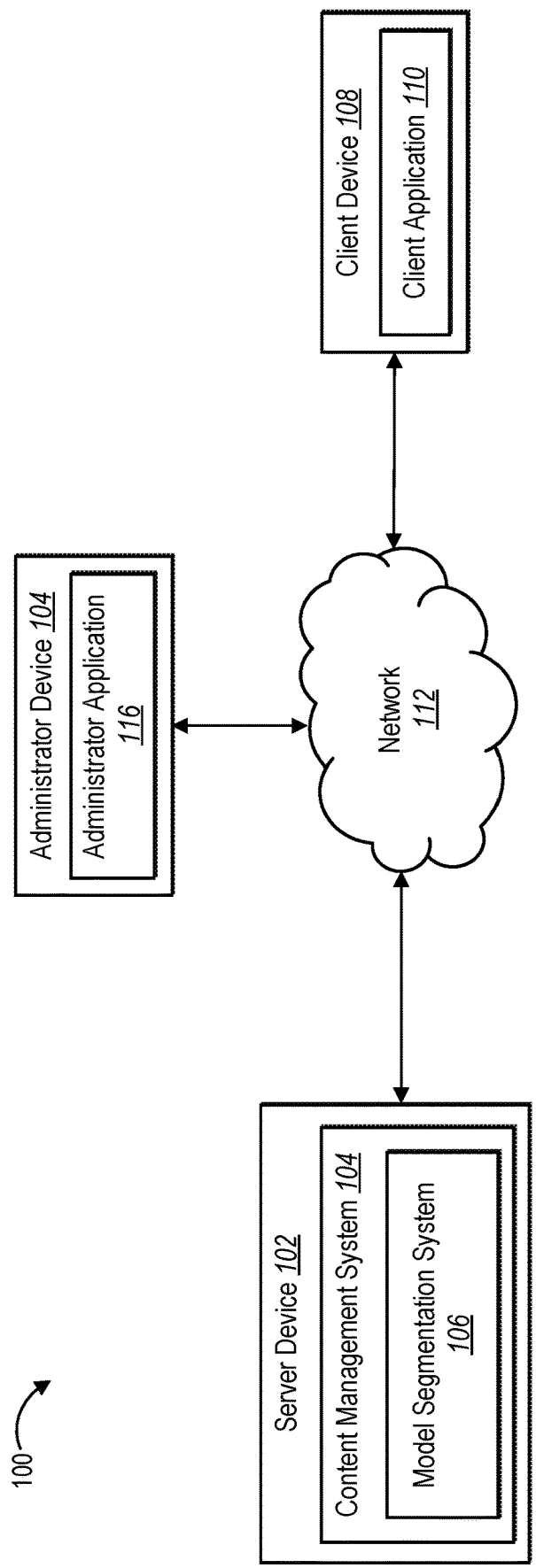
FIG. 1 illustrates a schematic diagram of a system environment in which the model segmentation system operates in accordance with one or more implementations.

This disclosure describes one or more implementations of a model segmentation system (e.g., a machine-learning model segmentation system) that generates accurate audience segments across multiple audiences utilizing multi-class decision tree machine-learning models. For example, in various implementations, the model segmentation system generates a customized loss penalty matrix from multiple loss penalty matrices. In particular, the model segmentation system can determine evaluation metrics (e.g., reach and accuracy) for a set of multi-class decision tree machine-learning models and then generate regression mappings comparing these evaluation metrics. Based on these regression mappings, the model segmentation system can determine target model evaluation metrics and then combine loss penalty matrices to generate a customized loss penalty matrix. The model segmentation system then utilizes the customized loss penalty matrix to build a multi-class decision tree machine-learning model to classify client devices into discrete audience segments. Further, in some implementations, the model segmentation system refines the multi-class decision tree machine-learning model based on adjusting the tree depth to improve accuracy while avoiding overfitting.

To illustrate, in one or more implementations, the model segmentation system generates multiple loss matrices that include penalty values for audience segment misclassifications corresponding to multiple audience segments. Additionally, in various implementations, the model segmentation system determines model evaluation metrics for multiple multi-class decision tree machine-learning models generated utilizing the loss matrices. The model segmentation system then generates a customized loss matrix for the audience segments based on a regression mapping of the model evaluation metrics. Further, the model segmentation system also generates a finalized multi-class decision tree machine-learning model from the customized loss matrix. Moreover, in some implementations, the model segmentation system utilizes the finalized multi-class decision tree machine-learning model to classify traits of a client device to a target audience segment of the audience segments.

As mentioned above, in various implementations, the model segmentation system generates a customized loss matrix that corresponds to multiple audience segments. For example, in some implementations, the customized loss matrix includes a separate row and column for each of the audience segments. In one or more implementations, the model segmentation system modifies a particular row and column of a customized loss matrix corresponding to a target audience segment. To illustrate, in various implementations, the model segmentation system generates multiple loss matrices for an audience segment of the group of multiple audience segments. For the target audience segment, the model segmentation system builds various multi-class decision tree machine-learning models, such as one model based on each of the generated loss matrices.

As previously mentioned, in some implementations, the model segmentation system determines model evaluation metrics for each of these models. For example, the model segmentation system generates a confusion matrix that includes the predictive and actual scores for all of the models. The model segmentation system then determines model evaluation metrics such as accuracy and reach for a target audience segment from the confusion matrix.

Additionally, in various implementations, the model segmentation system compares the model evaluation metrics (e.g., by mapping the model evaluation metrics to a chart) and then determines a regression mapping fit to the model evaluation metrics. For example, the regression mapping reflects predicted reach and accuracy combinations of a multi-class decision tree machine-learning model across various ranges of the model evaluation metrics. In various implementations, the model segmentation system identifies user input with respect to the regression mapping that specifies a desired model evaluation metric with respect to the target audience segment. For instance, the model segmentation system identifies a desired accuracy score and/or reach score based on the user input that corresponds to a location along the regression mapping.

Moreover, in one or more implementations, the model segmentation system determines a customized loss matrix based on the identified accuracy and reach score (e.g., the selected location along the regression mapping). For example, in some implementations, the model segmentation system identifies boundary models (and corresponding loss matrices) with model evaluation metrics adjacent to the identified location. Then, based on the loss matrices of those boundary models, the model segmentation system interpolates a customized loss matrix. For instance, in various implementations, the model segmentation system determines weighting coefficients for each model based on the distance of each model to the identified location. The model segmentation system then combines the loss penalty values from the corresponding loss matrices utilizing the weighting coefficients in a manner that preserves both row and column information in the customized loss matrix. Further, the model segmentation system updates each of the rows and columns in the customized loss matrix based on repeating the above process for each of the audience segments.

In some implementations, the model segmentation system determines whether a different tree depth to the decision tree model would improve the evaluation metrics. In these implementations, the model segmentation system generates trees of varying depths and tests the trees according to the model evaluation metrics. In various implementations, the model segmentation system also analyzes the multi-class decision tree model to determine whether a given tree depth is resulting in overfitting. Further, in one or more implementations, the model segmentation system provides one or more evaluation metrics as well as overfitting scores for each multi-class decision tree machine-learning model and allows for a selection of a target tree depth.

Based on the customized loss matrix, and in some cases the target tree depth, the model segmentation system trains a final instance of a multi-class decision tree machine-learning model. For example, the model segmentation system utilizes training data to train a finalized multi-class decision tree machine-learning model to generate a decision tree model having the target tree depth. Further, the model segmentation system utilizes fresh testing data to ensure that the finalized multi-class decision tree machine-learning model achieves the specified model evaluation scores.

In one or more implementations, the model segmentation system prepares and partitions training data for training and testing the various multi-class decision tree machine-learning models. For example, the model segmentation system balances a training data set by upsampling and/or downsampling classes within the dataset. Further, in various implementations, the model segmentation system partitions the training dataset into different groups for initial training, initial evaluations, determining a target tree depth, final training, final evaluations, and/or cross-validations.

In various implementations, the finalized multi-class decision tree machine-learning model separates each of the audience segments into discrete class nodes. For example, in one or more implementations, the finalized multi-class decision tree machine-learning model provides trait recency rules and frequency rules for each audience segment in a manner that eliminates overlap between groups. Then, when a client device exhibits one or more traits, the model segmentation system utilizes the recency rules and frequency rules to classify the client device to a target audience segment. Further, in example implementations, the model segmentation system provides digital content corresponding to the target audience segment, as further described below.

As mentioned above, conventional systems suffer from a number of problems with regard to the accuracy, efficiency, and flexibility of computing device operations. To illustrate, regarding accuracy, conventional systems often produce inaccurate audience segments that have large amounts of membership overlap. For instance, some conventional systems generate and evaluate audience segments independent of the other audience segments. Accordingly, multiple audience segments comprise imprecise and overlapping criteria for audience members and various client devices/individuals are included in multiple audience segments. For example, in many instances, audience segments are built with less-relevant traits and suboptimal frequency and recency rules, which leads to audience overlap and other inaccuracies. As a result of imprecise criteria, client devices/individual (e.g., client devices corresponding to individual users) are often placed in one or more imprecise audience segments. This further results in conventional systems providing less relevant digital content to client devices based on their misclassification in an audience segment.

As another illustration, many conventional systems are built based on empirical experience of one or more administrators. For example, an administrator, who may have knowledge and experience with audience behaviors, projects their knowledge across all audience segments and interacts with various user interfaces in selecting and creating audience segment rules. In contrast to data-driven evidence, this administrator empirical experience is often limited and myopic. As a result, conventional systems generate inaccurate audience segments from these suboptimal rules. Further, these conventional systems also include large amounts of overlap, which includes the issues discussed above.

With respect to efficiency, many conventional systems are complex and inefficient. To illustrate, despite being limited to identifying audience segments individually, several conventional systems utilize complex approaches to determine an audience segment. As part of this complexity, conventional systems require users to have an intimidating amount of expertise and knowledge to properly create, use, and apply rules. For example, in some conventional systems, users must interact with a variety of different user interfaces and elements to list and define traits for each audience segment as well as provide corresponding recency and frequency rules. Because of complexities, many users cannot utilize these conventional systems in a manner that is accurate or efficient. Moreover, as a result of the multitude of user interactions and interfaces, conventional systems often waste significant time and computer resources.

Further, conventional systems that create inaccurate audience segments triggers additional inefficiencies. To illustrate, if an individual place in multiple audience segments, the conventional systems may waste processing power, bandwidth, and memory resources providing digital content to inaccurate client devices. For example, upon a client device visiting a website, the conventional system identifies and provides content based on one of the audience segments in which the client devices is classified. Misclassification results in inaccurate and unnecessary distribution of digital content to the client device.

As mentioned above, many conventional systems are also inflexible. As one example, several conventional systems determine audience segments individually. Indeed, these conventional systems rigidly use multiple distinct models to determine various segments. As a result, these conventional systems generate rules that are not in harmony with one another. Moreover, the complexity of these and other conventional systems fail to provide a balanced outcome across each of the audience segments, which often causes minority audience segments to be ignored in multiple models.

The model segmentation system can provide numerous advantages and benefits over conventional systems. As described below, in many implementations, the model segmentation system improves accuracy relative to conventional systems. To illustrate, the model segmentation system can generate a customized loss matrix that corresponds to multiple audience segments (e.g., classes of audiences). As mentioned above, in many implementations, the customized loss matrix includes a row and a column (i.e., sets of values) dedicated to each audience segment, and together, the customized loss matrix reflects a relationship between each audience segment. Moreover, because the customized loss matrix corresponds to multiple audience segments, the model segmentation system can utilize the customized loss matrix to generate a single finalized multi-class decision tree machine-learning model that outputs determinations and rules for the multiple audience segments at the same time. As a result, the amount of overlap between audience segments is eliminated, which dramatically improves accuracy. By way of empirical evidence, researchers have found that conventional systems suffer from around 40% audience overlap, while the model segmentation system audience eliminates audience overlap in many instances—a significant accuracy improvement.

Additionally, when comparing the model segmentation system to conventional systems, researchers have found significant improvement in classification accuracy. For example, researchers have found that one or more implementations of the model segmentation system achieves accuracy improvements ranging from 167% for one audience segment class to 500% for another audience segment class and to 615% for yet another audience segment class (measured based on conversion lifts).

In addition to determining how to accurately generate non-overlapping (or minimal overlapping) audience segments, the model segmentation system increases accuracy to computing devices and the field of digital content dissemination by eliminating wasteful transmissions of incorrect digital content. Indeed, because of the reduced overlap, client devices/individuals are more accurately classified to appropriate audience segments. Accordingly, the model segmentation system is able to reduce the computing waste that occurs when providing irrelevant digital content to individuals who are misclassified or inaccurately classified into multiple audience segments.

As an additional example, the model segmentation system can improve accuracy utilizing a data-driven approach. For instance, rather than relying on administrator empirical experience and user interaction with various user interfaces to select various heuristics, the model segmentation system generates various decision tree models based on empirical data, which is then used to generate a customized loss matrix as described above. Further, the model segmentation system is able to use empirical data corresponding to multiple audience segments together, which further increases computing accuracy. Moreover, in various implementations, the model segmentation system applies additional techniques, such as tree depth search and cross-validation, to obtain further accuracy improvements, as detailed below.

Further, the model segmentation system can also improve efficiency and performance relative to conventional systems. By automatically generating a multi-class decision tree machine-learning model, the model segmentation system can significantly reduce user interactions, user interfaces, and user interface elements with a corresponding reduction in wasted time and computing resources. Moreover, the model segmentation system does not require that separate models be generated and applied for each audience segment independently. Rather, the model segmentation system generates a single multi-class decision tree machine-learning model that corresponds to multiple audience segments. Thus, in various implementations, the model segmentation system requires less overhead and resources than conventional systems.

As a result, the model segmentation system also often improves flexibility relative to conventional systems. Indeed, unlike conventional systems, the model segmentation system is not rigidly tied to complex operations and sophisticated operator knowledge. In contrast, the model segmentation system utilizes reduced user interactions to generate a set of audience segment rules that correspond to multiple audience segments, as laid out above. Indeed, the model segmentation system provides computing flexibility such that even novice users are able to easily utilize the system and quickly obtain accurate results. Additional advantages and benefits of the object selection system will become apparent in view of the following description.

As illustrated by the foregoing discussion, the present disclosure utilizes a variety of terms to describe the features and advantages of the media segment system. To illustrate, the term "machine-learning model" refers to computer-implemented algorithms that model high-level abstractions in data by generating data-driven predictions or decisions from the known input data. Examples of machine-learning models include computer representations that are tunable (e.g., trained) based on inputs to approximate unknown functions. For instance, a machine-learning model includes a model that utilizes algorithms to learn from, and make predictions on, known data by analyzing the known data to learn to generate outputs that reflect patterns and attributes of the known data. For example, machine-learning models include decision tree models, random forest models, gradient boosting models (e.g., XGBoost), neural networks, linear regression models, logistical regression models, or support vector machines (SVM) models. More specifically, while the disclosure describes generating audience segments utilizing multi-class decision tree machine-learning models, the model segmentation system is able to utilize other machine-learning models such as random forest models, gradient boosting models, or other models.

In various implementations, the model segmentation system utilizes loss matrices to train multi-class decision tree machine-learning models. As used herein, the term "loss matrix" refers to a data structure having sets of values (e.g., rows and columns) that include penalty values indicating a learning penalty for misclassifying an input sample. For example, in some implementations, a loss matrix includes penalty values for audience segment misclassifications corresponding to a plurality of audience segments. In various implementations, a loss matrix includes penalty values along a center diagonal indicating a penalty of zero, which is applied when an input sample is correctly classified. In one or more implementations, the model segmentation system generates a customized loss matrix that concurrently corresponds to multiple audience segments.

As used herein, the term "audience segment" or "segment" refers to a group, category, or classification of client devices/individuals. For example, in one or more implementations, an audience segment refers to a client device/individual that performs an action (or is predicted to perform an action) or has (or will have) a particular trait. To illustrate, an audience segment can include client devices that interact with (e.g., click) on a website element or that purchase a product or service via a website. Client devices/individuals may be grouped into an audience segment based on detected traits. In one or more implementations, the multi-class decision tree machine-learning models generate classifications and/or rules corresponding to multiple audience segments. Further, in various implementations, a target audience segment refers to a particular audience segment from a group of audience segments. For instance, the media segmentation system assigns a client device of an individual to a target audience segment based on traits corresponding to the client device/individual.

In various implementations, the term "model evaluation metric" refers to a measured performance or characteristic of a multi-class decision tree machine-learning model. For instance, the model segmentation system utilizes one or more model evaluation metrics to compare different instances of multi-class decision tree machine-learning models. Examples of model evaluation metrics include accuracy and reach. As used herein, the term "accuracy" refers to a measure of alignment or correspondence between client devices/individuals and an assigned audience segment. For example, the term accuracy can include a number or percentage of client devices/individuals that are accurately classified to a particular audience segment. The term "reach" refers to a measure of aggressiveness or application of an audience segment. For example, reach can include a measure of the number (or percentage) of client devices/individuals assigned to a particular audience segment. In various implementations, one or more model evaluation metrics are generated from a confusion matrix of audience segments based on predicted classifications and actual classifications of the audience segments, as further described below.

In various implementations, a multi-class decision tree machine-learning model outputs rules corresponding to various implementable metrics, such as recency and frequency. As used in various implementations, the term "recency" refers to a time period (e.g., a time window) from measurement (or occurrence) of one or more traits. For example, recency indicates a time that has elapsed since a trait (e.g., an event) was measured, such as a number of days since a client device accessed a product website (e.g., a website hit) and a product conversion (e.g., a product purchase). In some implementations, the term "frequency" refers to how many times a trait has been measured (e.g., how frequently an event has occurred).

As used herein, the term "trait" corresponds to measurable behaviors, characteristics, and actions of a client device/individual. A trait can be measured, captured, and stored in a variety of ways, such as cookies or other tracking elements implemented via a client device or server visited by a client device. Examples of traits include website visits, clicks, digital cart additions, purchases, downloads, streams, interactions, and so forth. Traits can also include various characteristics, such as demographic characteristics, device type, software type, operating system type, etc.

Additional detail regarding the model segmentation system will now be provided with reference to the figures. For example, FIG. 1 illustrates a schematic diagram of a digital medium system environment 100 in which a model segmentation system 106 operates in accordance with one or more implementations. As shown in FIG. 1, the digital medium system environment 100 ("environment 100") includes a server device 102, a client device 108, and an administrator device 114 connected via a network 112. Additional detail regarding these computing devices is provided below in connection with FIG. 10. In addition, FIG. 10 also provides additional detail regarding networks, such as the illustrated network 112.

As shown, the server device 102 includes a content management system 104. The content management system 104 is able to perform a variety of functions. For example, in one or more embodiments, the content management system 104 facilitates the distribution of various digital content items across the network 112. In one or more implementations, the content management system 104 facilitates identifies, receives, accesses, opens, loads, edits, modifies, moves, copies, shares, saves, removes, deletes, stores, downloads, transmits, and/or imports digital content. Examples of digital content range from websites and emails to advertisements and promotions. For instance, in some implementations, the content management system 104 populates a website with digital content for a particular product when the client device 108 visits the website.

As illustrated, the content management system 104 includes a model segmentation system 106 (i.e., a machine-learning model segmentation system). While shown within the content management system 104, in various implementations, the model segmentation system 106 is located apart from the content management system 104. Further, in some implementations, the model segmentation system 106 is implemented on the administrator device 114, or across multiple computing devices (e.g., on both the server device 102 and the administrator device 114).

In one or more implementations, the model segmentation system 106 trains and utilizes a multi-class decision tree machine-learning model to generate a decision tree that includes multiple audience segments. More specifically, the decision tree includes multiple leaf nodes that specify parameters for classifying client devices into different audience segments in a non-overlapping manner. As further described below, in various implementations, the model segmentation system generates the multi-class decision tree machine-learning model utilizing a loss matrix customized across the multiple audience segments. In some implementations, the customized loss matrix is also based on user input, such that the resulting multi-class decision tree machine-learning model is tailored to a particular set of needs.

As illustrated in FIG. 1, the environment 100 includes the administrator device 114. In various implementations, the administrator device 114 interacts with the model segmentation system 106 to generate and build a multi-class decision tree machine-learning model. For example, the administrator device 114 provides input with respect to one or more audience segments, which the model segmentation system 106 utilizes for generating a customized loss matrix as well as a multi-class decision tree machine-learning model. In various implementations, the administrator device 114 include an administrator application 116 (e.g., a web browser or a mobile application) that enables the administrator device 114 to interact with the model segmentation system 106.

Additionally, the environment 100 includes the client device 108. In some implementations, the client device 108 accesses the model segmentation system 106. For instance, a client application 110 (e.g., a web browser or a mobile application) on the client device 108 provides data to the model segmentation system 106. For example, the client application 110 provides cookie, session, or other trait information to the model segmentation system 106 that is utilized to classify the client device 108 to a particular audience segment.

Although FIG. 1 illustrates a particular number, type, and arrangement of components within the environment 100, various additional environment configurations are possible. For example, the server device 102 represents a set of connected server devices. Additionally, the server device 102 may communicate directly with the client device 108, bypassing the network 112, or utilizing a separate and/or an additional network. Further, in some implementations, the environment 100 includes additional components, such as additional client devices or a digital content repository that maintains digital content (e.g., advertisements).

Figure 2:
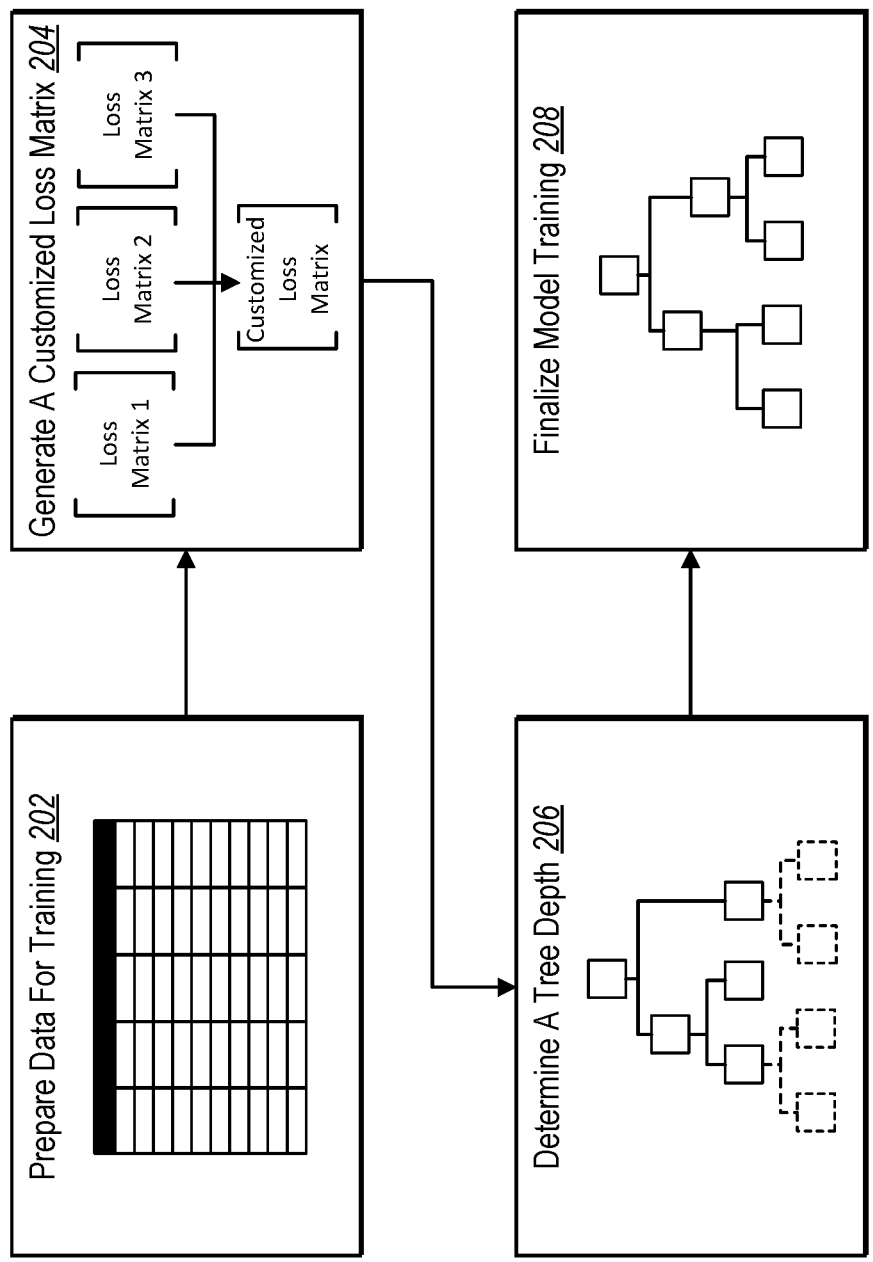
FIG. 2 illustrates an overview diagram of training a multi-class decision tree machine-learning models in accordance with one or more implementations.

As discussed above, in various implementations, the model segmentation system 106 trains a multi-class decision tree machine-learning model to generate audience segments that result in no membership overlap. For example, FIG. 2 shows an overview diagram of generating and utilizing multi-class decision tree machine-learning models in accordance with one or more implementations. In particular, FIG. 2 includes a series of acts performed by the model segmentation system 106 for training multi-class decision tree machine-learning models.

As shown in FIG. 2, the model segmentation system 106 performs an act 202 of preparing data for training. For example, in one or more implementations, the model segmentation system 106 gathers, sorts, integrates, and compiles data from multiple sources into a format suitable for training a multi-class decision tree machine-learning model (or simply "decision tree model"). For instance, the model segmentation system 106 compiles data corresponding to website visits, product impressions, product purchases, etc. to generate a table of values used to train one or more decision tree models. Additional detail regarding preparing data for training is provided below with respect to FIG. 3.

As illustrated in FIG. 2, the model segmentation system 106 also performs an act 204 of generating a customized loss matrix. For instance, in various implementations, the model segmentation system 106 creates a range of loss matrices that include different misclassification penalties. These loss matrices are designed in such a way that their encapsulated penalties generate a set of unique models that cover a spectrum of scores and characteristics that range from reach-heavy to accuracy-heavy. Based on those loss matrices and, in some cases, user input, the model segmentation system 106 generates the customized loss matrix, which the model segmentation system 106 utilizes to train a decision tree model. As mentioned above, in some implementations, the customized loss matrix includes misclassification penalties uniquely tuned for each audience segment. Additional detail regarding generating a customized loss matrix is provided below with respect to FIGS. 4A-4C.

As shown, the model segmentation system 106 also performs an act 206 of determining a tree depth. For instance, in various implementations, the model segmentation system 106 samples different tree depths for the decision tree model to determine whether a more precise and accurate model is possible. In evaluating different tree depths, the model segmentation system 106 verifies that a more precise decision tree model is not overfitted to the training data (e.g., learning data), which could cause accuracy issues when being implemented online with non-training data. Additional detail regarding determining a target tree depth is provided below with respect to FIG. 5.

As shown in FIG. 2, the model segmentation system 106 also performs an act 208 of finalizing model training. For example, in various implementations, the model segmentation system 106 utilizes the customized loss matrix and the determined tree depth to train a final version of the decision tree model. In various implementations, the model segmentation system 106 utilizes cross-validation in the training data to ensure that the finalized decision tree model produces accurate and reliable (i.e., not overfitting) audience segments. Additional detail regarding finalizing model training of a decision tree model is provided below with respect to FIG. 6.

Figure 3:
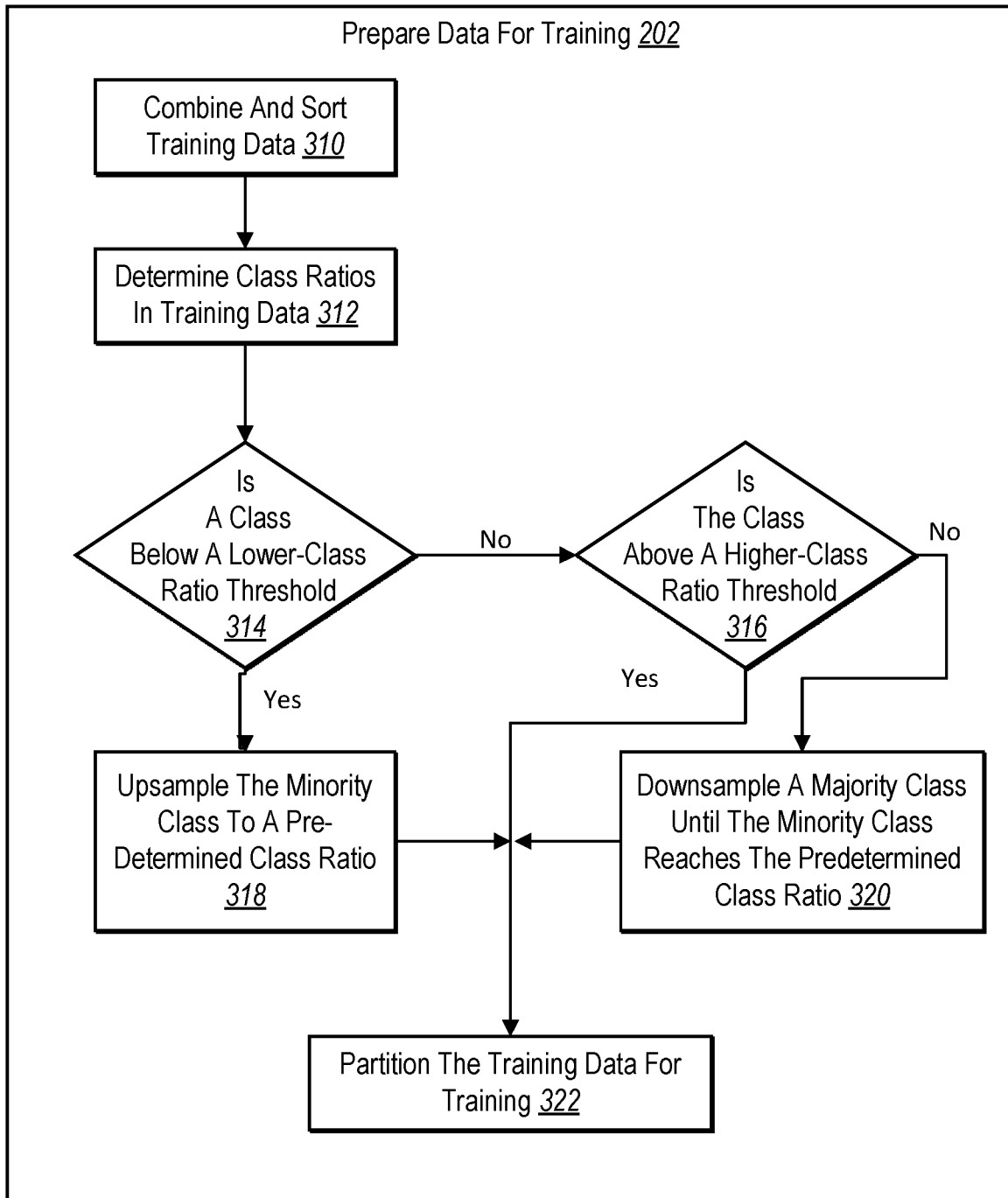
FIG. 3 illustrates a state diagram of preparing training data for a multi-class decision tree machine-learning model in accordance with one or more implementations.

As mentioned above, in one or more implementations, the model segmentation system 106 prepares data for training one or more decision tree models. To illustrate, FIG. 3 shows an overview diagram of training multi-class decision tree machine-learning models in accordance with one or more implementations. As shown in FIG. 3, the act 202 of preparing data for training from FIG. 2 is expanded to include a state diagram of additional acts of preparing data for training deep learning models.

As shown in FIG. 3, the model segmentation system 106 performs an act 310 of combining and sorting training data.

In various implementations, the training data is based on behavior information by client devices associated with individuals (e.g., detected browsing activity). In many instances, behavior information allows the model segmentation system 106 to more precisely infer the intention of individuals over other information types. As a simplified example, an individual browsing photo editing on a website suggests an interest in an audience segment corresponding to photo editing software.

In various implementations, the act 310 of combining and sorting training data includes identifying behavior information having conversion information and segment activity information. The model segmentation system 106 then transforms the segment activity information (e.g., often across multiple sessions) based on recency (e.g., the time period in which an event occurred) and frequency (e.g., the number of times the event occurs within the time period). Further, the model segmentation system 106 merges the information into the training data.

Additionally, based on one or more sources of behavior information, the model segmentation system 106 generates training data that includes a client device identifier (e.g., a cookie identifier), recency and frequency activity information for multiple segments, as well as an audience. In these implementations, the recency and frequency activity information for the different segments serve as model inputs, where the model is trained to classify the input to an audience segment (e.g., the model learns a decision tree path of recency and frequency rules that creates a path to the audience segment), and the audience serves as a supervised ground truth utilized to train the decision tree model.

In one or more implementations, the training data is stored in a database or table. For example, the training data comprises a SQL database. In alternative implementations, the model segmentation system 106 stores the training data in a table or similar data structure. In some implementations, the model segmentation system 106 obtains training data compiled by another system, such as a content management system.

In various implementations, the model segmentation system 106 generates the training data from multiple data tables. For example, in example implementations, the model segmentation system 106 accesses a hit-level web browsing table that includes cookie identifier for client devices, a hit identifier, a website visited, and a timestamp. In some implementations, the hit-level web browsing table includes an order identifier and a product identifier (e.g., product SKU) when a product is purchased. In addition, the model segmentation system 106 accesses a webpage product mapping table that maps webpages to segments and/or a product identifier mapping table that maps product identifiers to segments. In these implementations, the model segmentation system 106 merges, combines, and transforms the data across these tables to generate the training data. Additional details with respect to generating training data are provided in U.S. Patent Publication Number 2020/0357026, "Machine Learning Assisted Target Segment Audience Generation," filed May 10, 2019, the entire contents of which is hereby incorporated by reference.

Once the training data is generated or otherwise obtained, the model segmentation system 106 verifies the training data for balance and robustness in various implementations. For example, the model segmentation system 106 ensures that minority classes (e.g., segments) are not ignored in training and implementation due to a lower volume of training data, which would cause skewed and inaccurate results. If needed, the model segmentation system 106 rebalances the training data as described with respect to acts 312-320, as described below.

To illustrate, as shown in FIG. 3 the model segmentation system 106 performs an act 312 of determining class ratios in the training data. For example, in one or more implementations, the model segmentation system 106 parses the training data to identify each segment in the training data (e.g., based on the audience). For each segment, the model segmentation system 106 determines the ratio of the segment compared to the total segments (e.g., the class ratio). In this manner, the ratios of all segments add up to 100%. The model segmentation system 106 then stores the ratio for each segment in the training data for further comparison.

In one or more implementations, the model segmentation system 106 assigns class size labels to one or more classes (e.g., segments). For example, if a class is below a minority class threshold (e.g., 10%, 15%, etc.), the model segmentation system 106 labels the class as a minority class. In another example, the model segmentation system 106 labels classes as majority classes if they satisfy a majority class threshold (e.g., 50%, 70%, etc.). In some implementations, the minority and majority class thresholds are based on the number of classes in the training data. For example, if there are five classes in the training data, the model segmentation system 106 labels any class with over 20% as a majority class.

As shown, the model segmentation system 106 performs an act 314 of determining whether a class (e.g., a minority class) is below a lower-class ratio threshold. For example, in one or more implementations, the lower-class ratio threshold is 3% of the training data. In alternative implementations, the lower-class ratio threshold is another amount. As shown, if the minority class satisfies (e.g., is at or above) the lower-class ratio threshold, the model segmentation system 106 proceeds to an act 316. Otherwise, the model segmentation system 106 proceeds to an act 318 when the class is below the lower-class ratio threshold.

As shown, the act 318 includes the model segmentation system 106 upsampling the minority class to a pre-determined class ratio. For example, in one or more implementations, the model segmentation system 106 identifies entries of the minority class in the training data and duplicates these existing entries until the class ratio of minority class meets a class balancing ratio (e.g., 10%, 15%, etc.), which is often larger than the pre-determined class ratio. In some implementations, the model segmentation system 106 upsamples the minority class until it no longer qualifies as a minority class. In various implementations, upsampling an extremely small minority class is preferred as it preserves a large part of data that may be lost from pruning (described below).

As mentioned above, in various implementations, the model segmentation system 106 proceeds to the act 316 of determining whether the class (e.g., the minority class) is above a higher-class ratio threshold. For example, in one or more implementations, the higher-class ratio threshold is 5% of the training data. In alternative implementations, the lower-class ratio threshold is another amount. As shown, if the minority class satisfies (e.g., is at or above) the higher-class ratio threshold, the model segmentation system 106 proceeds to an act 322. Otherwise, the model segmentation system 106 proceeds to an act 320 when the class is above the lower-class ratio threshold and below the higher-class ratio threshold.

As shown, the act 320 includes the model segmentation system 106 downsampling a majority class until the minority class reaches the pre-determined threshold. For example, in one or more implementations, the model segmentation system 106 removing entries from one or more majority classes until the minority class increases its class ratio to the class balancing ratio described above (or a different predetermined threshold). In these implementations, the model segmentation system 106 lowers the class ratio of one or more majority classes through pruning, which results in the class ratio of the minority class increasing.

While FIG. 3 shows downsampling occurring before upsampling, in one or more implementations, the model segmentation system 106 switches the order of these acts when rebalancing the training data. Further, in some implementations, these acts utilize the same pre-determined class ratio (e.g., the class balancing ratio). In alternative implementations, the model segmentation system 106 utilizes different pre-determined class ratios for the minority class when upscaling and downscaling the training data. Moreover, in some implementations, the model segmentation system 106 utilizes a combination of upscaling and downscaling, such as upsampling an extremely small class until it satisfies the lower-class ratio, then downsampling the majority class until the minority class reaches the pre-determined class ratio.

Upon upsampling or downsampling the disclosed systems, when necessary, the model segmentation system 106 proceeds to the act 322 of partitioning the training data for training. As mentioned above, in various implementations, the model segmentation system 106 performs cross-validation with the training data. In these implementations, the model segmentation system 106 is able to perform cross-validation (further described below) utilizing partitioned training data.

To illustrate, in various implementations, the model segmentation system 106 partitions the training data into various portions. For example, the model segmentation system 106 generates a training portion (e.g., 80% of all data) that includes data for training, lost matrix and tree depth testing, and a final test portion (e.g., 20% of all data).

Often the model segmentation system 106 partitions the training data utilizing random sampling. In some implementations, the model segmentation system 106 ensures that the training data portion is balanced and/or each class has a minimum amount of representation. As described below, partitioning data enables the model segmentation system 106 to immediately test parameters and outcomes of a decision tree model, improve model accuracy, as well as prevent model overfitting, each of which is described further below.

Figure 4A:
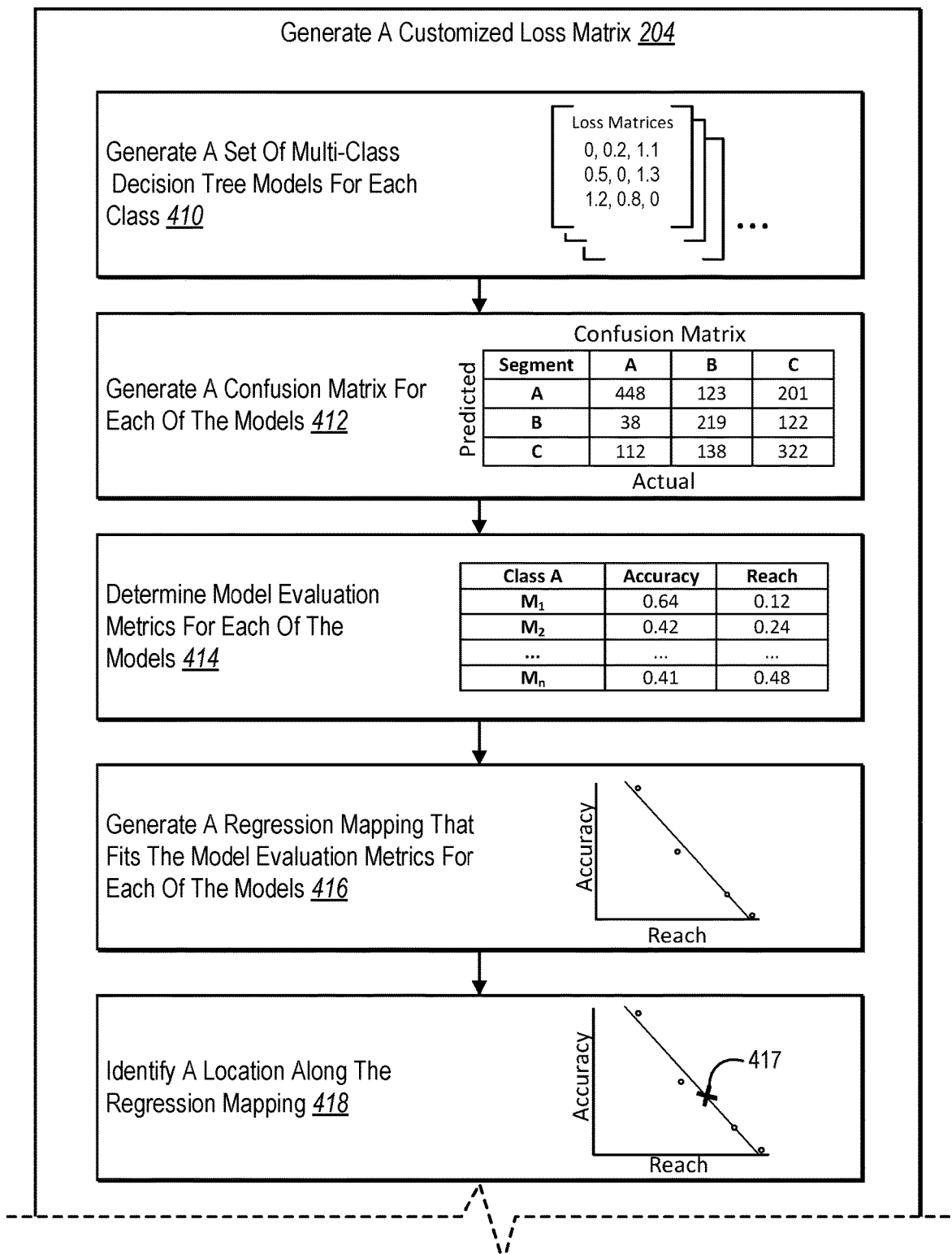
FIGS. 4A-4C illustrate block diagrams and a graphical user interface of generating a customized loss matrix in accordance with one or more implementations.
Figure 4B:
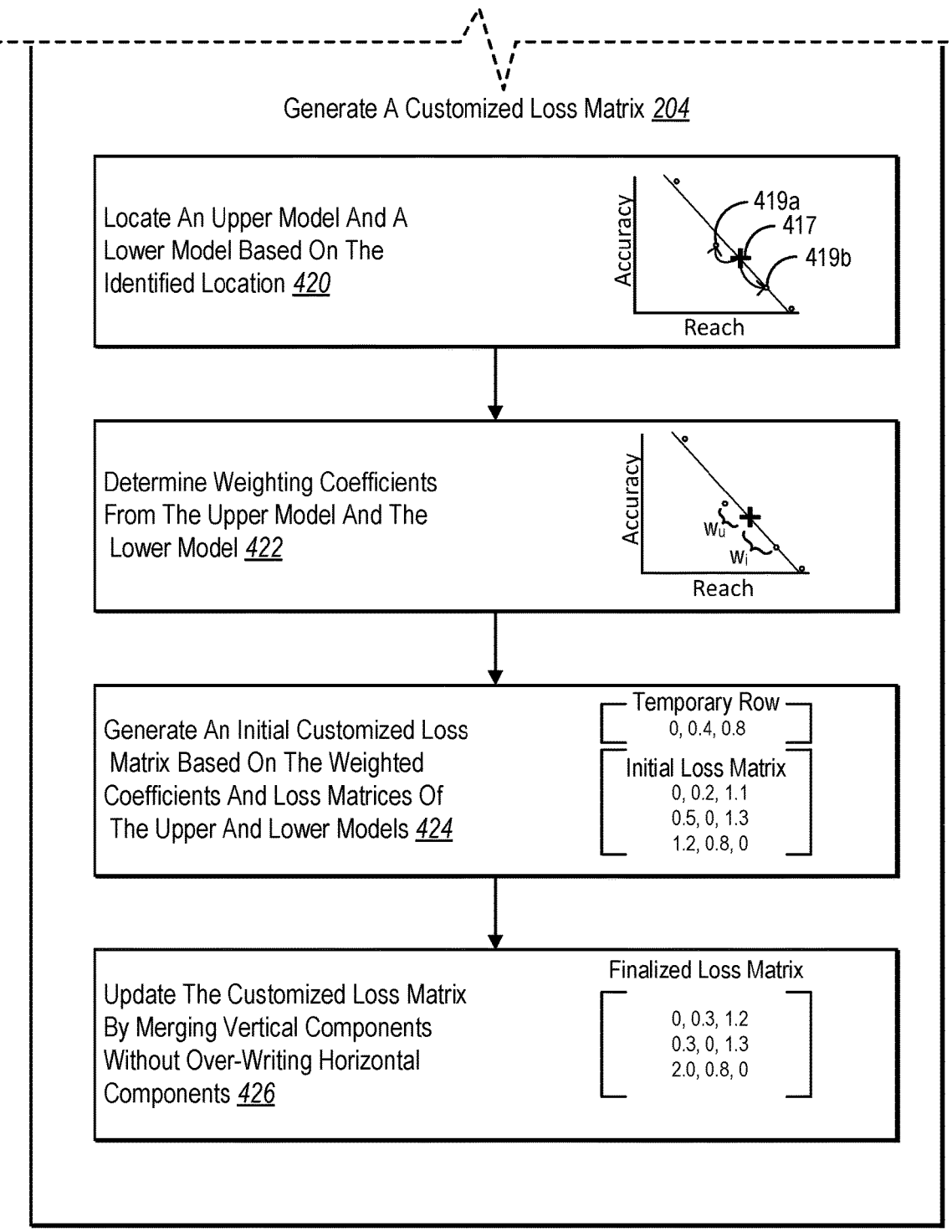
Figure 4C:
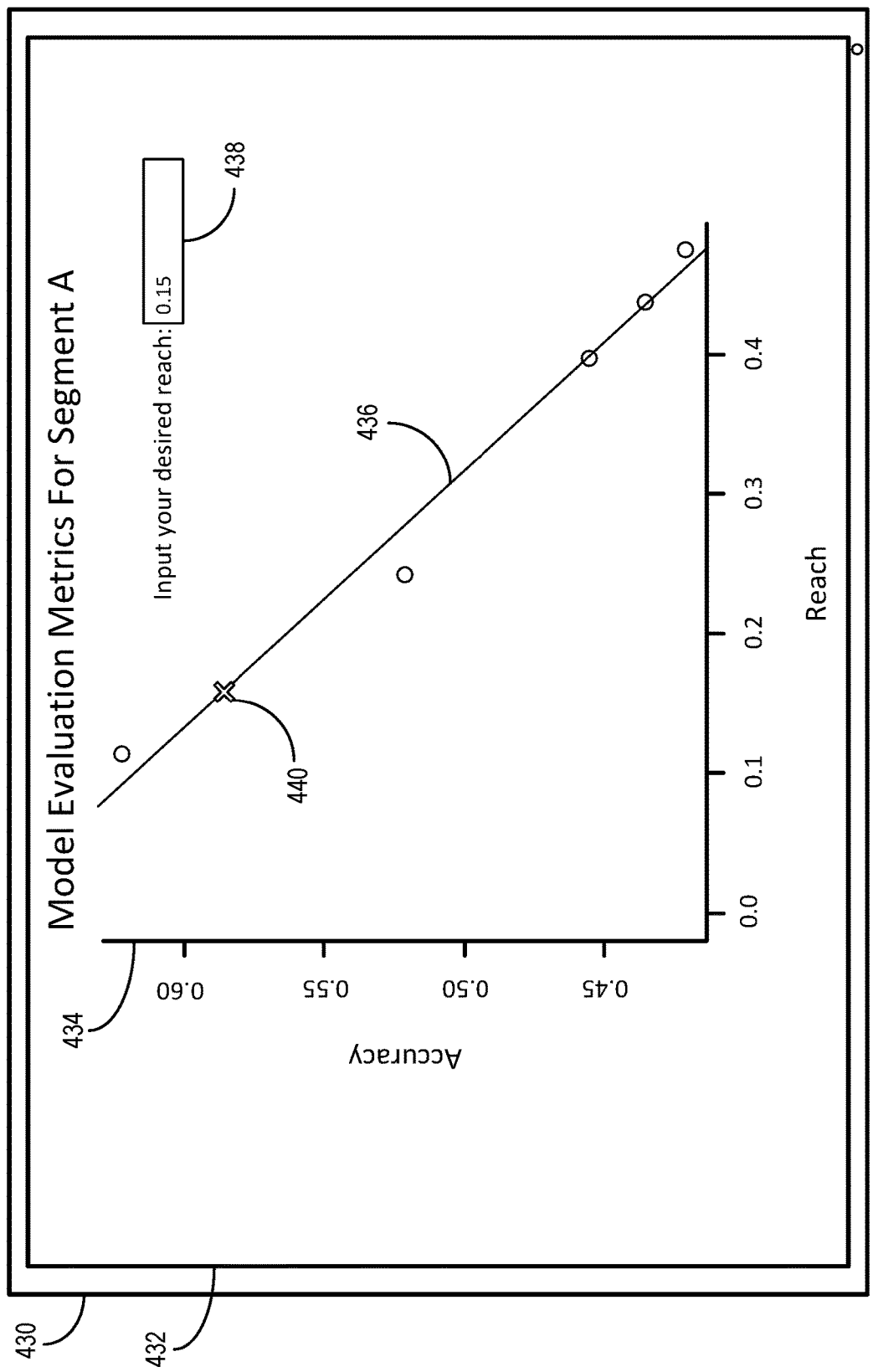

As mentioned above, FIGS. 4A-4C provide additional detail regarding generating a customized loss matrix. In particular, FIGS. 4A-4C illustrate block diagrams and a graphical user interface of generating a customized loss matrix in accordance with one or more implementations. As shown in FIGS. 4A-4B, the act 204 of generating a customized loss matrix from FIG. 2 is expanded to include a series of additional acts. FIG. 4C illustrates a graphical user interface corresponding to generating a customized loss matrix, as further described below.

As briefly described above, the model segmentation system 106 determines a customized loss matrix based on generating multiple decision tree models that result in a range of reach and accuracy scores. To generate these multiple decision tree models, the model segmentation system 106 first utilizes a set of loss matrices to train the multiple decision tree models. The model segmentation system 106 then evaluates the trained decision tree models using a testing portion from the training data. The model segmentation system 106 then generates a customized loss matrix based on interpolating from the multiple decision tree models and corresponding loss matrices. While this overview is given for context, each of these actions is further described below.

As shown, FIG. 4A includes an act 410 of generating a set of multi-class decision tree machine-learning models. For example, in one or more implementations, the model segmentation system 106 creates, identifies, or otherwise obtains multiple loss matrices. In one or more implementations, the model segmentation system 106 identifies one set of loss matrices per class included in the training data. In alternative implementations, the model segmentation system 106 identifies a set of loss matrices that corresponds to multiple (or all) classes in the training data.

As mentioned above, a loss matrix includes a grid of values where each number represents a penalty for each type of classification. More specifically, a loss matrix includes penalty values that penalize a decision tree model for classifying a set of traits (from a client device) to the incorrect audience segment. In many implementations, a loss matrix includes a separate row and column for each audience segment. For example, given five segments, a loss matrix includes five rows and five columns.

In various implementations, the penalty values are positive numbers that increase as the penalty grows. Further, in one or more implementations, the loss matrix includes a diagonal column having the value of zero (i.e., 0) where the row and the column for the same segment meet. These diagonal values represent where a decision tree model correctly classified a set of traits to an audience segment. Accordingly, the model segmentation system 106 does not penalize for correct classifications.

As mentioned above, in various implementations, the model segmentation system 106 identifies multiple loss matrices. In one or more implementations, the model segmentation system 106 automatically generates a set of loss matrices that includes varying penalty values across the different loss matrices that result in a range of reach and accuracy scores, as noted above and further described below. Indeed, in some implementations, the set of loss matrices includes outlier loss matrices as well as more median loss matrices to ensure a range of decision tree models may be produced, as described below.

To further illustrate, when generating or updating a loss matrix, in one or more implementations, the model segmentation system 106 increases the loss penalty at a location where a decision tree model is consistently confusing (e.g., misclassifying) one segment for another. In this manner, the model segmentation system 106 will learn to confuse these segments less as future similar misclassifications result in a larger penalty. However, while the increased penalty may improve the accuracy of a segment, it may also have the undesirable effect of decreasing the reach of the segment, as accuracy and reach are inversely proportional as further described below.

While the model segmentation system 106 automatically generates the loss matrices, in some implementations, the loss matrices are manually generated. In various implementations, the loss matrices in a set are identified for previous iterations or versions of a decision tree model. In a few implementations, the model segmentation system 106 utilizes a separate machine-learning model to generate one or more loss matrices in a set of loss matrices.

As previously mentioned, in a number of implementations, the model segmentation system 106 trains decision tree models with the set of loss matrices. For example, in one or more implementations, the model segmentation system 106 generates a decision tree model for each loss matrix in a set of loss matrices. Further, in various implementations, the model segmentation system 106 generates each decision tree model utilizing the same or different training portions of the training data. In various implementations, the model segmentation system 106 trains each decision tree model in a supervised manner utilizing the training data.

In addition, in these implementations, the model segmentation system 106 evaluates the performance of each trained decision tree model. To illustrate, in one or more implementations, the model segmentation system 106 utilizes the loss matrix testing portion of the training data to determine model evaluation metrics for each decision tree model. For example, the model segmentation system 106 provides the transformed trait information from the loss matrix testing portion of the training data to each decision tree model, which predicts an audience segment based on the input data.

In many implementations, the model segmentation system 106 summarizes the results of each model in a streamlined manner. To illustrate, FIG. 4A includes an act 412 of generating a confusion matrix for each model in the set of multi-class decision tree machine-learning models. As shown in connection with the act 412, a confusion matrix includes a row and column for each segment.

In various implementations, in each confusion matrix, the rows correspond to actual classifications and the columns correspond to predicted classifications (or vice versa). In general, for a target audience segment, the confusion matrix indicates correct predictions, false-positive predictions, and false-negative predictions. To illustrate, as shown, the intersection of Row A and Column A (i.e., "448") indicates the number of times the decision tree model classifies (e.g., predicted) samples as Segment A where the ground truth indicated Segment A, the intersection of Row A and Column B (i.e., "123") indicates the number of times the decision tree model classified samples as Segment A where the ground truth indicated Segment B, and the intersection of Row B and Column A (i.e., "38") indicates the number of times the decision tree model classified samples as Segment B where the ground truth indicated Segment A.

In one or more implementations, the model segmentation system 106 generates a confusion matrix that includes a separate row and column for each audience segment. In some implementations, the model segmentation system 106 generates a two-by-two matrix where the first row and first column correspond to a target audience segment and the second row and the second column correspond to an aggregation of the remaining audience segments.

As mentioned above, in various implementations, the model segmentation system 106 evaluates each of the decision tree models each trained with a different loss matrix in the set of loss matrices for model evaluation metrics. In one or more implementations, the model evaluation metrics include reach scores and/or accuracy scores. As shown, FIG. 4A includes an act 414 of determining model evaluation metrics for each of the models. For example, in one or more implementations, the model segmentation system 106 utilizes the prediction classifications and actual classifications from the confusion matrices for each segment to determine accuracy scores and reach scores of each trained decision tree model.

In various implementations, the reach metric or statistic provides a measurement of aggressiveness of a decision tree model. For instance, in one or more implementations, the reach metric corresponds to the number or percentage of predicted segments out of the total number of segments. To illustrate, Equation 1 below provides an example formulation of calculating the reach of a segment.

$$\text{reach of segment } s = \frac{M[s, s]}{\sum M[, s]} \quad (1)$$

In Equation 1, M represents the confusion matrix having rows corresponding to predicted classifications and columns corresponding to actual classifications (such as shown in the act 412). Further, the M[i,j] represents the indexed entry of prediction classification (i) and actual classification (j). Accordingly, the reach of a target segment equals the number of correctly classified segments divided by the combination of the number of correctly classified segments plus all other actual classifications for the segment (e.g., each number in the column corresponding to the segment). Thus, using the confusion matrix in the act 412, the reach of Segment A equals 448/(448+38+112).

In one or more implementations, the accuracy metric or statistic corresponds to the number or percentage of correctly predicted segments out of the total number of segments (e.g., predicted segments that actually belong to the target segment). To illustrate, Equation 2 below provides an example formulation of calculating the accuracy of a segment.

$$\text{accuracy of segment } s = \frac{M[s, s]}{\sum M[s,]} \quad (2)$$

In Equation 2, M also represents the confusion matrix having rows corresponding to predicted classifications and columns corresponding to actual classifications. Similarly, the M[i,j] represents the indexed entry of prediction classification (i) and actual classification (j). Accordingly, the reach of a target segment equals the number of correctly classified segments divided by the combination of the number of correctly classified segments plus all predicted classifications for the segment (e.g., each number in the row corresponding to the segment). Thus, using the confusion matrix in the act 412, the accuracy of Segment A equals 448/(448+123+201).

As mentioned above, in many implementations, reach and accuracy are inversely related. In particular, as the reach of a segment increases, the accuracy will decrease because the decision tree model will classify the target audience segment aggressively and make more mistakes (e.g., incorrect classifications). Likewise, as the reach of a segment decreases, the accuracy will increase because the decision tree model will be more hesitant to misclassify the segment.

In some implementations, administrators prefer larger reach scores where a decision tree model is more aggressive in its classification of a target segment. In alternative implementations, administrators prefer more accurate scores. Accordingly, while some implementations employ a default ratio of reach to accuracy, other implementations allow for an administrator to input their desired reach score and/or accuracy score for one or more audience segments, as described further below.

To illustrate, FIG. 4A shows an act 416 of generating a regression mapping that fits the model evaluation metrics for each of the models. For example, in one or more implementations, the model segmentation system 106 utilizes the reach scores and the accuracy scores from the models to plot data points on a chart, as shown. Further, in these implementations, the model segmentation system 106 generates a regression mapping, such as a linear regression line, a logarithmic regression curve, or another type of mapping that fits the plotted data points. Indeed, the model segmentation system 106 may generate a separate regression mapping for each segment.

In one or more implementations, the regression mapping or model represents the span of the theoretical range of achievable scores for a segment based on the given training data. Indeed, given the set of training data (e.g., the training portion of the training data) and a modified loss matrix, the model segmentation system 106 should be able to obtain any ratio between reach and accuracy that lies along the regression mapping.

As shown, FIG. 4A includes an act 418 of identifying a location along the regression mapping. As shown, the location 417 is indicated as an "X" along the regression mapping (e.g., a linear regression line). In one or more implementations, the location is selected based on user input. For example, the model segmentation system 106 detects a user selection of the location 417 from a client device associated with a user. In alternative implementations, the model segmentation system 106 receives text input specifying a desired reach score and/or accuracy score. A more detailed example of receiving user input is provided in FIG. 4C below.

In various implementations, the model segmentation system 106 automatically determines the location 417 without user input. For example, in one or more implementations, the model segmentation system 106 utilizes a default ratio of reach to accuracy. In some implementations, the model segmentation system 106 determines the location 417 based on the type of segments being classified. For instance, the model segmentation system 106 selects a higher reach score for a first segment type and a lower reach score for a second segment type. Further, in these implementations, the model segmentation system 106 may allow for user input to modify the automatic selections.

Based on the location 417, in various implementations, the model segmentation system 106 identifies target model evaluation metrics (e.g., the reach and accuracy scores) and generates a decision tree model that produces these target metrics. As mentioned above, the model segmentation system 106 utilizes a loss matrix to train a decision tree model. Additionally, by varying the penalty values in the loss matrix, the model segmentation system 106 is able to arrive at different model evaluation metrics. Accordingly, based on the location 417, the model segmentation system 106 should be able to determine a customized loss matrix that trains a decision tree model to produce the target model evaluation metrics. This process is described with respect to acts 420-426, as shown in FIG. 4B.

As shown, FIG. 4B includes an act 420 of locating an upper model and a lower model based on the identified location 417. For example, in various implementations, the model segmentation system 106 identifies the boundary models that are next to and/or surround the location 417. For instance, in one or more implementations, the model segmentation system 106 identifies the closest decision tree models to the location 417 in either direction along the regression mapping. In example implementations, the model segmentation system 106 identifies two decision tree models that are both above or both below the location 417 (e.g., if the location is beyond one of the edge models, the model segmentation system 106 could identify the two closest decision tree models as the upper and lower models)

In some implementations, the model segmentation system 106 identifies one decision tree model having a higher reach score and one decision tree model having a lower reach score than the reach score at the location 417. To illustrate, the act 420 shows the model segmentation system 106 identifying the upper decision tree model 419a and the lower decision tree model 419b on each side of the location 417.

In one or more implementations, when determining boundary models to the location 417, the model segmentation system 106 utilizes the formulations found in Equation 3 to identify the lower (e.g., min) decision tree model and the upper (e.g., max) decision tree model.

$$b_l[k] = \min\left(\frac{1}{\text{points}[k][\text{reach}] - reach_{target}[k]}\right) \quad (3)$$

$$b_u[k] = \max\left(\frac{1}{\text{points}[k][\text{reach}] - reach_{target}[k]}\right)$$

$$k \in \text{specified segments}$$

In Equation 3, l represents the lower model, u represents the upper model, and k represents a target segment. Indeed, using Equation 3, the model segmentation system 106 locates the indices (e.g., data points) of boundary decision tree models for a target segment.

Upon locating boundary decision tree models (e.g., upper and lower models), in various implementations, the model segmentation system 106 determines distances between these boundary models and the location 417. To illustrate, FIG. 4B shows an act 422 of determining weighting coefficients for the upper model and the lower model. Indeed, in one or more implementations, the model segmentation system 106 determines weighting coefficients based on the distance of each model to the location 417 along the regression mapping.

In some implementations, the model segmentation system 106 determines the distance of the reach (or the accuracy) between models. To illustrate, Equation 4 below shows formulations for determining weighted coefficients to be applied to boundary data of the boundary decision tree models.

$$w_l[k] = 1 - (reach_{target[k]} - \text{points}[k][b_l[k], \text{reach}])$$

$$w_u[k] = 1 - (\text{points}[k][b_u[k], \text{reach}] - reach_{target[k]}) \quad (4)$$

In addition to determining upper and lower weighted coefficients for the upper and lower decision tree models, in one or more implementations, the model segmentation system 106 also identifies the loss matrix corresponding to the boundary models. For example, the model segmentation system 106 identifies the lower loss matrix corresponding to the lower decision tree model (e.g., the loss matrix utilized to train the lower decision tree model to cause it to yield the lower reach and accuracy score of the lower decision tree model 419b). Similarly, the model segmentation system 106 identifies the upper loss matrix corresponding to the upper decision tree model 419a. The model segmentation system 106 may identify these corresponding loss matrices before or after determining the weighted coefficients.

As shown, FIG. 4B includes an act 424 of generating an initial customized loss matrix based on the weighted coefficients and loss matrices of the upper and lower models. For example, in one or more implementations, the model segmentation system 106 performs a horizontal merge between the two boundary matrices, weighted by the coefficients according to their distance from the location, to generate an initial customized loss matrix. In particular, in example implementations, the model segmentation system 106 merges the horizontal components of the upper and lower loss matrices while also applying their corresponding coefficient weights.

In one or more implementations, the model segmentation system 106 generates a temporary row added to or outside of an existing customized loss matrix. For example, because the model segmentation system 106 may repeat the process of tuning each segment to a desired model evaluation metric (e.g., a target reach or accuracy for each segment), the model segmentation system 106 may have already begun to generate a customized loss matrix that includes updated rows and columns corresponding to other segments. Accordingly, to prevent overwriting these values, the model segmentation system 106 generates a temporary row (e.g., an temporary and/or initial set of values) corresponding to the target segment.

To illustrate, in one or more implementations, the model segmentation system 106 utilizes the formulation shown in Equation 5 below to weight, merge, and insert a temporary row into a customized loss matrix. In Equation 5, F'[k,] represents the temporary row being added for target segment k.

$$F'[k,]=0.5(w_l[k]*\text{points}[b_l[k],\text{matrix}][k,]+w_u[k]*\text{points}[b_u[k],\text{matrix}][k,]) \quad (5)$$

As shown, following the formulation in Equation 5, the model segmentation system 106 identifies the row in the lower loss matrix as well as the row in the upper loss matrix that correspond to the target segment. Further, the model segmentation system 106 applies the lower coefficient weight (e.g., $w_l$) to the lower loss matrix segment row as well as applies the upper coefficient weight (e.g., $w_u$) to the upper loss matrix segment row. The model segmentation system 106 then adds the segment row values together and divides them by half to generate the temporary row F'[k,] (e.g., an initial set of values).

As mentioned above, a loss matrix includes both a row and a column corresponding to a target segment. Accordingly, in generating the customized loss matrix, the model segmentation system 106 modifies both of these elements. Indeed, in various implementations, the model segmentation system 106 performs a vertical boundary merge by combining the vertical components of the upper and lower loss matrices into part of the customized loss matrix. To illustrate, FIG. 4B includes an act 426 of updating the customized loss matrix by merging vertical components without over-writing horizontally merged components.

In one or more implementations, to avoid over-writing the horizontal components added from Equation 5, the model segmentation system 106 performs a two-part process of first merging the horizontal components of the upper and lower loss matrices, then blending the merged horizontal components from the temporary row with the merged vertical components to generate the customized loss matrix. In this manner, the model segmentation system 106 preserves and applies both the horizontal and vertical components of the boundary loss matrices.

To illustrate, in one or more implementations, the model segmentation system 106 utilizes the formulation shown in Equation 6 below to weight, merge, and insert a temporary row into a customized loss matrix. In Equation 6, F[,k] represents the column being modified in the customized loss matrix for target segment k.

$$F[,k]=0.5(w_l[k]*\text{points}[b_l[k],\text{matrix}][,k]+w_u[k]*\text{points}[b_u[k],\text{matrix}][,k]) \quad (6)$$

As shown, the formulation in Equation 5 is similar to that of Equation 6, where Equation 5 corresponds to merging rows of loss matrices for a segment (creates a temporary row F[k,]) and Equation 6 corresponds to merging columns of the loss matrices for the same segment. Indeed, in both cases, the model segmentation system 106 utilizes the penalty values of the boundary loss matrices to determine initial segment penalty values for the initial customized loss matrix.

After merging both row and column components for the target segment from the boundary loss matrices, in various implementations, the model segmentation system 106 combines the entry in the customized loss matrix where the row for the target segment meets the column for the target segment. By first computing the merged values for this entry separately, then merging the entries together, the model segmentation system 106 incorporates the information from both computations without over-writing either value. To illustrate, in a number of implementations, the model segmentation system 106 utilizes the formulation in Equation 7 below to update the column of the customized loss matrix with the temporary row information without destroying the row data.

$$F_{Final} = \frac{F' + F}{2} \quad (7)$$

As described, in various implementations, the model segmentation system 106 first generates a temporary row with merged horizontal values for a target segment, generates a column with merged vertical values for the target segment, then combines the overlapping values. In some implementations, the model segmentation system 106 switches the processing order. For example, in one or more implementations, the model segmentation system 106 generates a temporary column for the vertically merged components of the segment, then updates a merged row of a customized loss matrix with one or more merged vertical values.

Upon updating the column and row in the customized loss matrix for the target segment, in various implementations, the model segmentation system 106 repeats the acts 410-426 for other segments. For example, the model segmentation system 106 uses the same or a different set of loss matrices (e.g., the act 410), plots the corresponding model evaluation metrics on a regression mapping (e.g., the act 416), identifies a location along the regression mapping (e.g., the act 418), determines the boundary loss matrices (e.g., the act 420) along with corresponding weighting coefficients (e.g., the act 422), and updates the row and column for the segment in the customized loss matrix (e.g., the acts 424-426). Indeed, for each segment in the customized loss matrix, the model segmentation system 106 merges the weighted values from the boundary loss matrices to generate an accurate and finalized customized loss matrix.

To illustrate, in one or more implementations, the model segmentation system 106 provides a first regression mapping for a first segment to an administrator device, which is generated based on a first set of loss matrices/decision tree models. Based on detecting a first selection location on the first regression mapping from the administrator device, the model segmentation system 106 generates a customized loss matrix that customizes a first set of values (e.g., rows and columns) specific to the first segment, as described above. In addition, the model segmentation system 106 generates a second regression mapping for a second segment from a second set of loss matrices/decision tree models (e.g., the same or different loss matrices from the first set of loss matrices). Further, the model segmentation system 106 provides the second regression mapping to the administrator device and upon detecting a second selection location on the second regression mapping from the administrator device, the model segmentation system 106 generates and/or updates the customized loss matrix. In particular, the model segmentation system 106 customizes a second sets of values (e.g., rows and columns) specific to the second segment in the customized loss matrix, where the first set of values differs from the second set of values in the customized loss matrix (with the exception of an overlapping matrix entry).

In one or more implementations, the model segmentation system 106 determines different values for the same entry in the customized loss matrix when performing computations for different segments. In one or more implementations, the model segmentation system 106 combines the values similar to the formula in Equation 7 or another formulation (e.g., averaging the two values). In some implementations, the model segmentation system 106 keeps one of the values and discards the other value, such as keeping the entry value computed first (or vice versa).

After iterating through each of the segments, the model segmentation system 106 has generated a single customized loss matrix having penalty values fine-tuned for each segment. As described above, the model segmentation system 106 then utilizes the finalized customized loss matrix to generate a single decision tree model (i.e., a multi-class classification decision tree machine-learning model) that accurately represents each of the multiple segments as well as minimizes or eliminate classification overlap.

As mentioned above, FIG. 4C illustrates a graphical user interface corresponding to generating a customized loss matrix. In one or more implementations, FIG. 4C corresponds to the act 418 described above within the acts 410-426. As shown, FIG. 4C includes an administrator device 430 having a graphical user interface 432. For example, the administrator device 430 represents the client device 108 introduced above that implements the model segmentation system 106.

As shown, the graphical user interface 432 includes a graph 434 of model evaluation metrics for multiple decision tree models of a target segment (e.g., "Segment A") generated from multiple loss matrices. As illustrated, the data points (e.g., circles) show the intersection of accuracy scores and reach scores for each decision tree model for the target segment. As also shown, the graph 434 includes a linear regression line 436 (i.e., a regression mapping) fit to the various data points, as described above. While the graph 434 shows a linear regression line, in some implementations, the regression mapping is a curve or other type of regression mapping.

In addition, the graphical user interface 432 includes an input field 438. As mentioned above, in one or more implementations, the model segmentation system 106 provides the graphical user interface 432 as an interactive interface to an administrator associated with the administrator device 430 and prompts the administrator to indicate a desired reach value (or accuracy value) by entering in a reach into the input field 438 or marking a location along the linear regression line 436. In this manner, the administrator interacts with the graphical user interface 432 via the input field 438 or the linear regression line 436.

To illustrate, in one instance, the administrator enters a reach value of "0.15" into the input field 438. In response, the model segmentation system 106 detects the user input and adds the location marker 440 on the linear regression line 436. In another instance, the administrator selects a spot on the linear regression line 436 (e.g., at the location marker 440). Again, in response, the model segmentation system 106 detects the user input and adds the location marker 440 on the linear regression line 436. Then, utilizing this location, the model segmentation system 106 continues to generate a customized loss matrix as described above.

As disclosed above, the model segmentation system 106 generates a multi-class decision tree model from the customized loss matrix, such that the decision tree model performs at the desired model evaluation metric (e.g., reach and/or accuracy) provided by the administrator. In particular, the trained decision tree model includes one or more nodes for each audience segment that includes non-overlapping frequency and recency rules corresponding to the segment.

In some implementations, the model segmentation system 106 performs additional actions to further improve the classification reach and accuracy of the model. For example, in one or more implementations, the model segmentation system 106 changes the node depth (e.g., level of nodes) in the tree. In many instances, increasing the tree depth adds additional nodes to the decision tree, which often makes the model more precise but at the cost of additional complexity and overfitting.

Additionally, FIGS. 4A-4C and the identified corresponding text describe various implementations of generating a customized loss matrix for a multi-class decision tree machine-learning model. Accordingly, the actions and algorithms described in connection with at least FIGS. 4A-4C, as well as the other figures referred to therein, provide example structure, architecture, and actions for performing a step for generating a customized loss matrix corresponding to accuracy and reach scores of the plurality of audience segments. Indeed, the disclosure provided in connection with FIGS. 4A-4C and the corresponding equations provide structure and actions for one or more of the algorithms corresponding to the model segmentation system 106 for generating a customized loss matrix.

Figure 5:
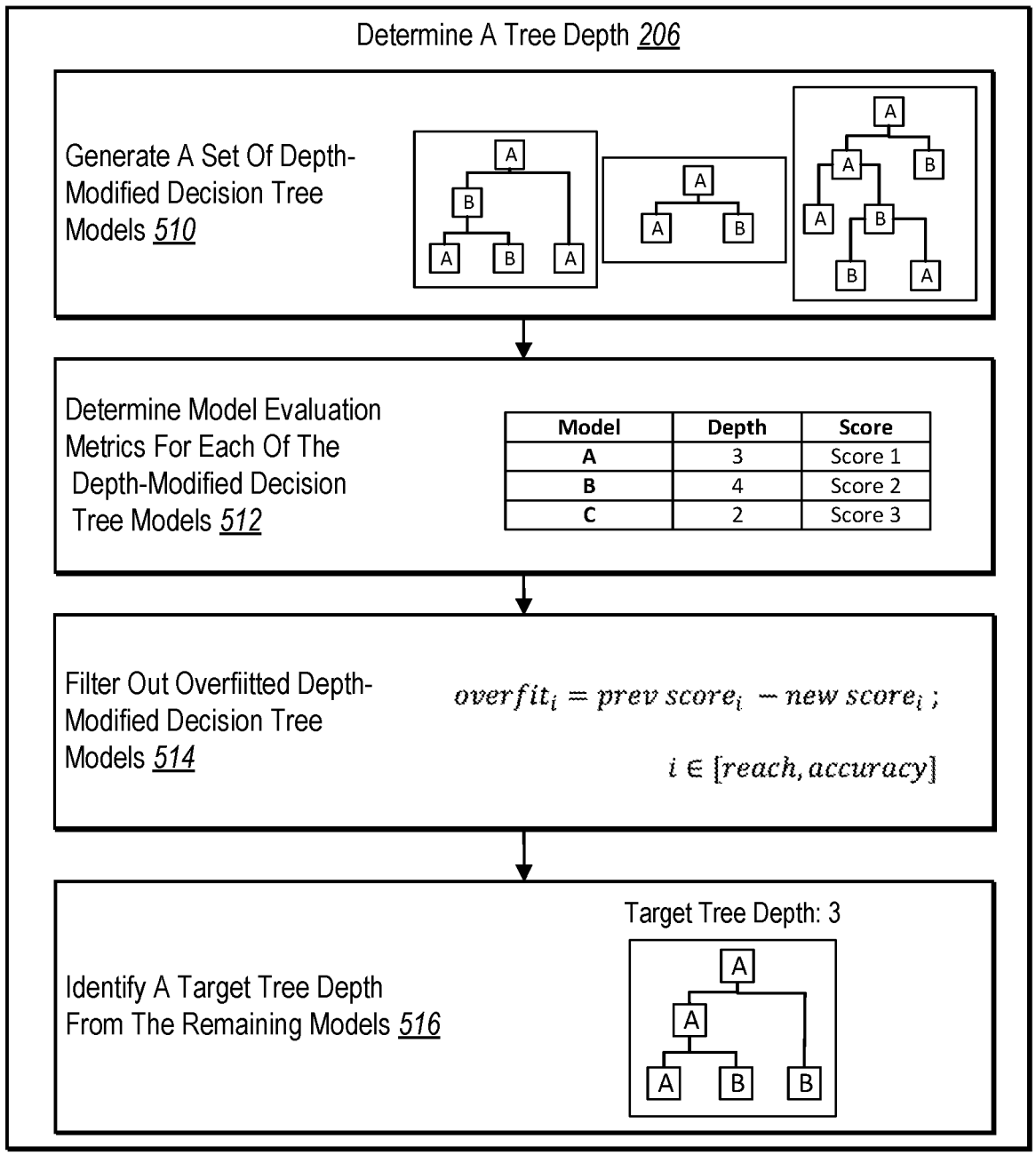
FIG. 5 illustrates a block diagram of determining a tree depth for a multi-class decision tree machine-learning model in accordance with one or more implementations.

As mentioned above, FIG. 5 provides additional detail regarding determining a tree depth. To illustrate, FIG. 5 shows a block diagram of determining a tree depth for a multi-class decision tree machine-learning model in accordance with one or more implementations. As shown in FIG. 5, the act 206 of determining a tree depth of a decision tree model from FIG. 2 is expanded to include a series of acts performed by the model segmentation system 106.

As shown, FIG. 5 includes an act 510 of generating a set of depth-modified decision tree models. For example, in one or more implementations, the model segmentation system 106 modifies a tunable tree-depth parameter when generating decision tree models utilizing the customized loss matrix to create a variety of decision tree models of different sizes and depths. In one or more implementations, the model segmentation system 106 utilizes the same portions of training data to train each of the decision tree models. In alternative implementations, the model segmentation system 106 utilizes different portions of the training data to generate the various decision tree models.

By way of example, the act 510 shows the model segmentation system 106 generating three different decision tree models. In this simplified example, each of the decision tree models includes two classes or audience segments (i.e., Segment A and Segment B). As shown, reducing the tree depth from three layers (e.g., the left model) to two layers (e.g., the middle model) decreases the total nodes from five to three and the leaf nodes from three to two. Similarly, increasing the tree depth by adding layers (e.g., the right model) results in creating additional nodes including leaf nodes. Nevertheless, while the number of nodes changes and the rules for deciding each audience segment becomes less or more precise (e.g., more nodes equates to increased decision precision), each leaf node remains as one of the two audience segments. In other words, in most implementations, increasing the tree depth does not create additional audience segments.

As shown, FIG. 5 includes an act 512 of determining model evaluation metrics for each of the depth-modified decision tree models. For example, in one or more implementations, the model segmentation system 106 evaluates each of the depth-modified decision tree models to generate model evaluation metrics as described above. In some implementations, the model segmentation system 106 determines the accuracy score of each depth-modified decision tree model utilizing the same testing data portion previously used to evaluate the decision tree model (e.g., a loss matrix testing portion). However, training and testing utilizing the same data may lead to overfitting the model, which is further described below.

Accordingly, in various implementations, the model segmentation system 106 utilizes a different portion of the training data (e.g., a tree depth testing portion) to determine model evaluation metrics for each of the depth-modified decision tree models. In this manner, the model segmentation system 106 determines whether modifying the tree depth increases the accuracy (and/or reach) of a decision tree model.

As shown, FIG. 5 includes an act 514 of filtering out overfitted depth-modified decision tree models. If the accuracy of a model improves too much (beyond a pre-determined amount between iterations), such model behavior often signals that the model is overfitted to the training data. Indeed, while adding depth to the decision tree model increases the number of nodes and decision precision, it may also be tailoring the decision tree model to narrowly fit the training data. However, when faced with other data from the real world, an overfit model may perform poorly and inaccurately.

As illustrated in the act 514, the model segmentation system 106 determines an overfitting score for each of the modified decision tree models. As shown, the model segmentation system 106 determines an overfit score for a depth-modified decision tree model by comparing the model evaluation metrics (e.g., accuracy and/or reach scores) for the depth-modified decision tree model to the previous model evaluation metrics (e.g., the accuracy and/or reach scores of an unmodified decision tree model). To illustrate, Equation 8 below shows a formula for determining an overfitting score for a depth-modified decision tree model.

$$\text{over fit}_i = \text{prev score}_i - \text{new score}_i$$

where $i \in [\text{reach}, \text{accuracy}]$ \hfill (8)

Further, in various implementations, the model segmentation system 106 compares the overfitting scores to an overfitting threshold. If the overfitting score for a depth-modified decision tree model exceeds the overfitting threshold, in some implementations, the model segmentation system 106 filters out the depth-modified decision tree model from consideration. For depth-modified decision tree models that satisfy the overfitting threshold, the model segmentation system 106 may retain these depth-modified decision tree models.

As shown, FIG. 5 includes an act 516 of identifying a target tree depth from the remaining models. In one or more implementations, the model segmentation system 106 selects the tree depth from the depth-modified decision tree model having the largest accuracy improvement while being within the overfitting threshold. In some implementations, the model segmentation system 106 selects the tree depth from the depth-modified decision tree model that has the lowest (or highest) ratio of accuracy score to overfitting score.

In various implementations, the model segmentation system 106 provides the overfit scores and/or one or more model evaluation metrics to an administrator device for display. In some implementations, the model segmentation system 106 shows the depth-modified decision tree model within the interactive graphical user interface 432 described above. For example, the model segmentation system 106 plots the model evaluation metrics within the graph 434 (or within another graph type such as a bar graph). In these implementations, upon detecting a selection of a depth-modified decision tree model, the model segmentation system 106 selects the corresponding tree depth.

Figure 6:
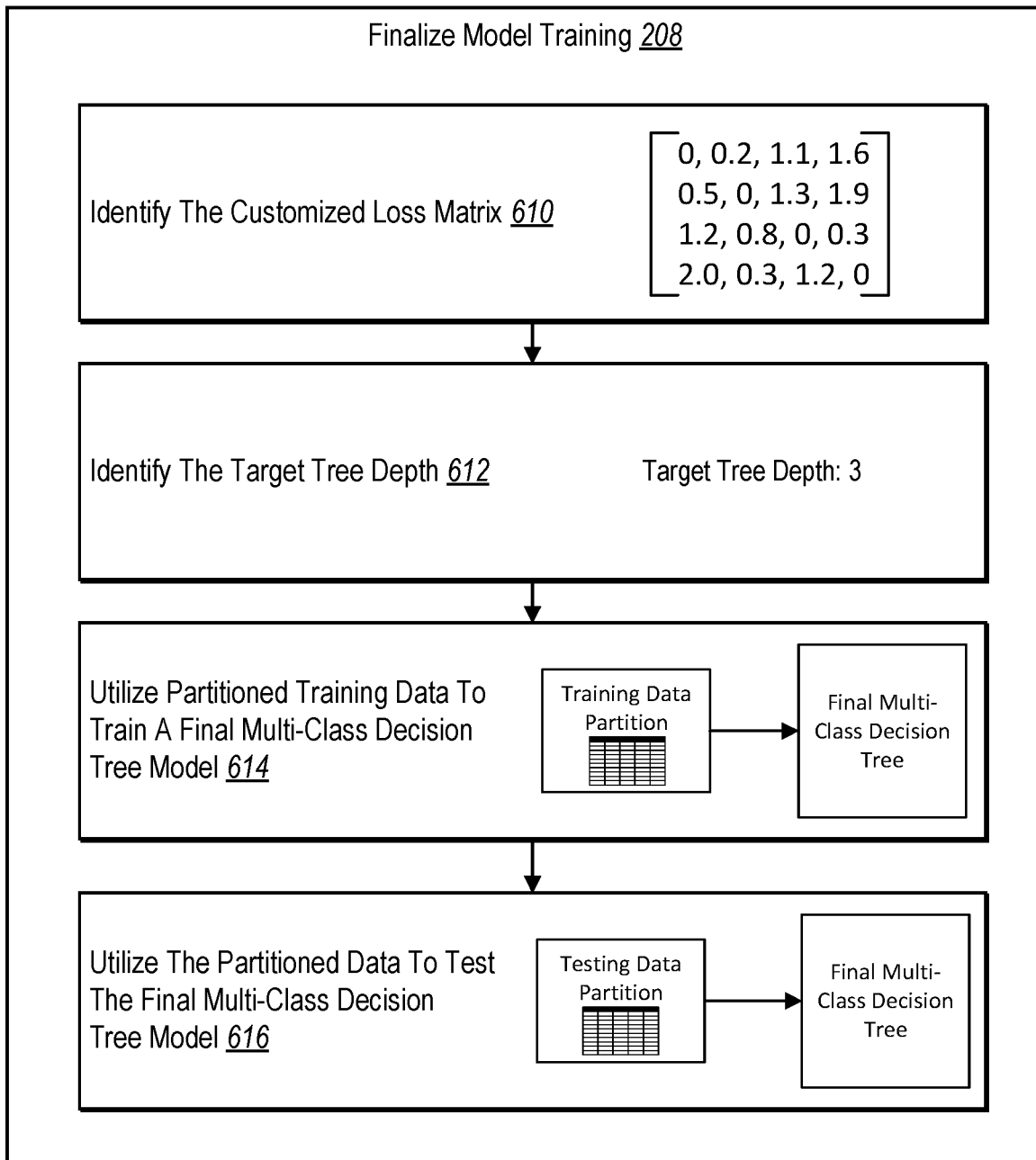
FIG. 6 illustrates a block diagram of finalizing the training of a multi-class decision tree machine-learning model in accordance with one or more implementations.

As mentioned above, FIG. 6 provides additional detail regarding finalizing model training of a decision tree model. To illustrate, FIG. 6 shows a block diagram of finalizing the training of a multi-class decision tree machine-learning model in accordance with one or more implementations. As shown in FIG. 6, the act 208 of finalizing model training from FIG. 2 is expanded to include a series of acts performed by the model segmentation system 106.

As shown in FIG. 6, the model segmentation system 106 performs an act 610 of identifying the customized loss matrix. As described above, the model segmentation system 106 generates a customized loss matrix that includes penalty values tuned to achieve the desired model evaluation metrics for each segment. As described above, in many implementations, the model segmentation system 106 utilizes a loss matrix testing portion of the training data to create the customized loss matrix.

As also shown in FIG. 6, the model segmentation system 106 performs an act 612 of identifying the target tree depth. In one or more implementations, after creating a customized loss matrix, the model segmentation system 106 searches varying tree depths to determine whether increasing (or decreasing) the tree depth of a decision tree model improves audience segmentation. As described above, in various implementations, the model segmentation system 106 samples different tree depths and tests them for overfit, accuracy, and/or reach. As also described above, in many implementations, the model segmentation system 106 utilizes a tree depth testing portion of the training data to identify a target tree depth.

FIG. 6 also illustrates the model segmentation system 106 performing an act 614 of utilizing partitioned training data to train a final multi-class decision tree model. In various implementations, utilizing the customized loss matrix and the target tree depth, the model segmentation system 106 generates a finalized decision tree model. In one or more implementations, the model segmentation system 106 utilizes a training portion of training data, which may be the same, overlapping, or different from the portion of training data used to train previous iterations of decision tree models.

In addition, FIG. 6 also includes an act 616 of utilizing the partitioned training data to test the final multi-class decision tree machine-learning model. For example, the model segmentation system 106 saves a final test portion of the training data to run final evaluations of the final decision tree model. In many implementations, the final test portion includes random portions of the training data that has not been previously used for training or testing. In this manner, the model segmentation system 106 verifies that the trained finalized multi-class decision tree machine-learning model produces the desired model evaluation metrics, even when processing new data. Indeed, throughout the various stages of training and testing, the model segmentation system 106 often interchanges portions of the training data to ensure a robust and accurate decision tree model through model cross-validation.

Figure 7:
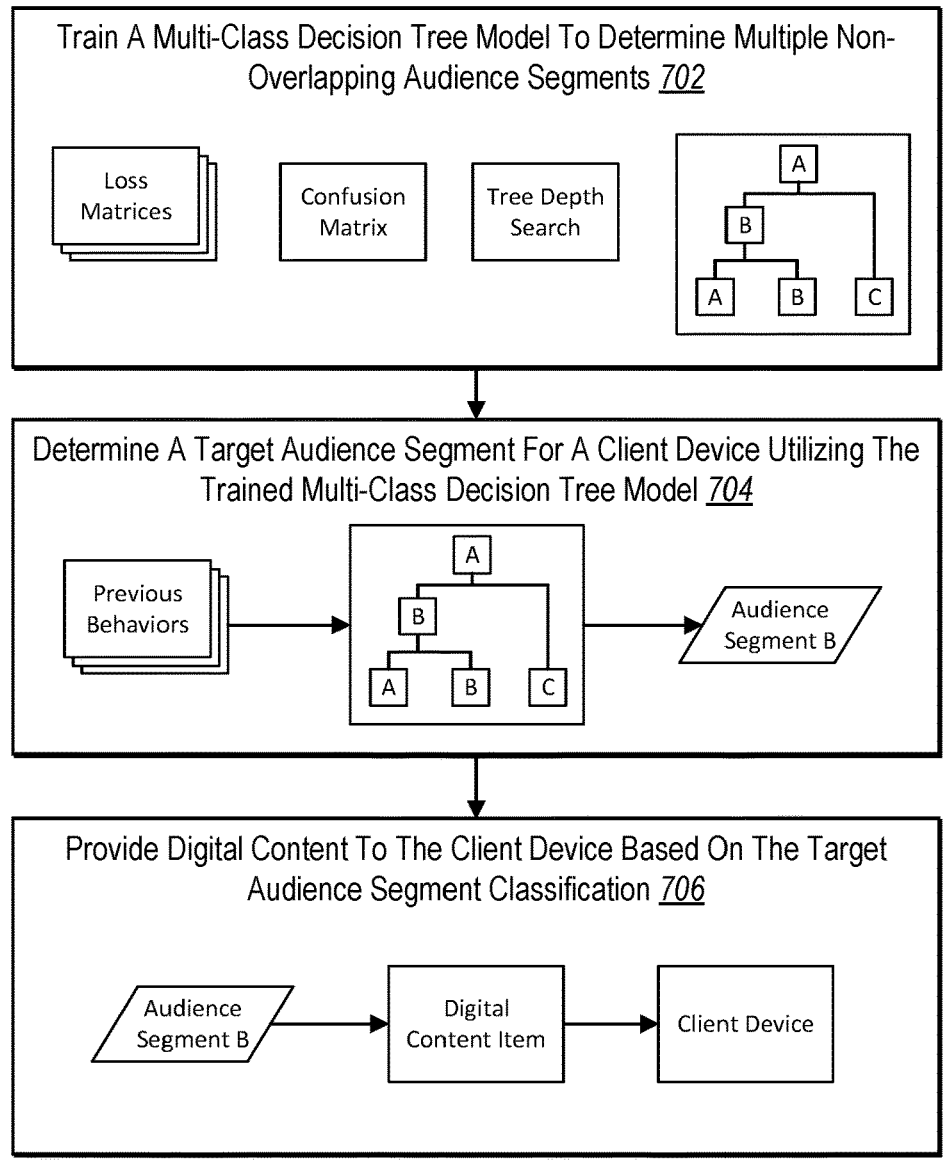
FIG. 7 illustrates a diagram of generating and utilizing multi-class decision tree machine-learning models in accordance with one or more implementations.

Once trained, the model segmentation system 106 is able to utilize the final multi-class decision tree machine-learning model to generate audience segments. To illustrate, FIG. 7 shows a diagram of generating and utilizing multi-class decision tree machine-learning models in accordance with one or more implementations. In various implementations, the model segmentation system 106 performs the series of act 700 shown in FIG. 7. In some implementations, another system, such as a content management system performs one or more of the acts shown in FIG. 7.

As shown, the series of acts 700 in FIG. 7 includes an act 702 of training a multi-class decision tree machine-learning model to determine multiple non-overlapping audience segments. As recently described above, in various implementations, the model segmentation system 106 generates a single finalized decision tree model that classifies multiple audience segments within the same model. In particular, the final decision tree model generates nodes that include trait frequency rules and recency rules used to classify client device into the multiple audience segments. Accordingly, because each of the multiple audience segments is included in the same decision tree model, where each audience segment includes distinct frequency rules and recency rules, classification overlap between audience segments is eliminated.

As shown, the series of acts 700 includes an act 704 of determining a target audience segment for a client device utilizing the trained multi-class decision tree machine-learning model. For example, a client device visits a website associated with the content management system. The model segmentation system 106 receives, either directly or via the content management system, one or more traits of the client device, such as hit recency and frequency. For example, the model segmentation system 106 identifies an electronic cookie, browser activity, other behavioral information from the client device indicating previous interactions with the website and/or related digital content. In example implementations, the model segmentation system 106 transforms the one or more traits into recency and frequency activity information using the same or a similar process as described above in connection with act 310 in FIG. 3.

Additionally, in one or more implementations, the model segmentation system 106 provides the recency and frequency activity information (i.e., transformed trait information) to the trained decision tree model for classification. In one or more implementations, the model segmentation system 106 compares the recency and frequency activity information of the client device to the recency rules and frequency rules of each tree node along a decision path until a leaf node is reached.

Indeed, unlike many conventional systems, the multi-class decision tree machine-learning model reveals the parameters (e.g., frequency rules and recency rules) associated with each node of the decision tree model. In particular, many conventional systems operate as black boxes where a classification model receives input and outputs a classification; however, the classification model does not reveal how it arrived at the classification. In contrast, the decision tree models described here provide information at each tree node (e.g., the parameters applied at each node) of how input data traverses the decision tree model at a given node. Further, the decision tree model can show the tree node path taken to arrive at the selected audience segment. In this manner, the decision tree model transparently reveals each step of the classification process. Accordingly, by utilizing a multi-class decision tree machine-learning model the model segmentation system 106 can extract and utilize various rules or heuristics (e.g., recency and frequency rules) that can be efficiently and accurately applied in real time (e.g., as client devices access websites or applications).

To illustrate, the model segmentation system 106 compares the recency and frequency activity information of the client device to the recency rules and frequency rules of the root node (labeled with an "A" in the act 704.) Based on whether the recency rules and frequency rules are satisfied, the model segmentation system 106 moves down the tree. For example, the model segmentation system 106 moves to the left node labeled with a "B." In some implementations, the model segmentation system 106 then compares the recency and frequency activity information of the client device to the recency rules and frequency rules of this node. In alternative implementations, the model segmentation system 106 compares other rules determined for each node of the decision tree model. Depending on the comparison, the model segmentation system 106 moves down and either left to classify the client device to Audience Segment A or right to classify the client device to Audience Segment B.

As shown, the series of acts 700 includes an act 706 of providing digital content to the client device based on the target audience segment classification. For example, in one or more implementations, the model segmentation system 106 and/or the content management system populates the webpage with one or more digital content items having images, text, and/or links corresponding to the target audience segment. For example, if the model segmentation system 106 classifies the client device as belonging to a photo editing audience segment, the content management system provides information to a photo editing product on the webpage being displayed to the client device.

In many implementations, the model segmentation system 106 determines based on one or more traits of a client device, that the client device does not belong to an audience segment or belongs to an audience segment not associated with digital content. In these implementations, the model segmentation system 106 directs the content management system to filter or screen out the client device. In this manner, the content management system does not expend computing and monetary resources on the client device, which is unlikely to lead to a conversion.

Figure 8:
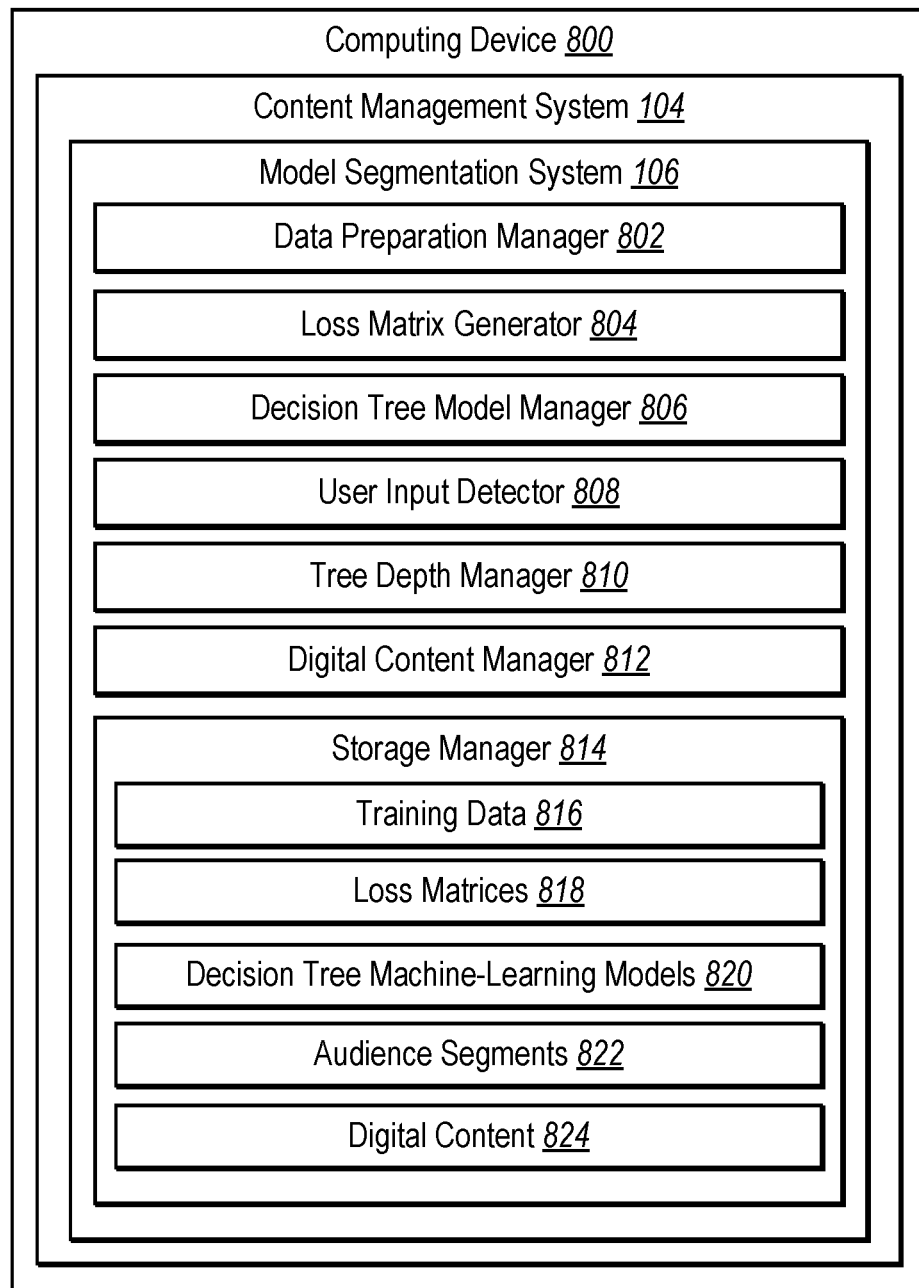
FIG. 8 illustrates a schematic diagram of the model segmentation system in accordance with one or more implementations.

Referring now to FIG. 8, additional detail is provided regarding the capabilities and components of a model segmentation system 106 in accordance with one or more implementations. In particular, FIG. 8 shows a schematic diagram of an example architecture of the model segmentation system 106 implemented within a content management system 104 and hosted on a computing device 800.

In addition, the computing device 800 may represent various types of computing devices (e.g., the server device 102 and/or the client device 108). For example, in one or more implementations, the computing device 800 is a non-mobile computing device, such as a server, a cluster of servers, a desktop, or another type of non-mobile computing device. In some implementations, the computing device 800 is a mobile computing device, such as a laptop, a tablet, a mobile telephone, a smartphone, a wearable device, or a device connected to the internet. Additional details with regard to the computing device 800 are discussed below with respect to FIG. 10.

As shown, the computing device 800 includes the content management system 104, which is described above, and the model segmentation system 106. The model segmentation system 106 includes various components for performing the processes and features described herein. To illustrate, the model segmentation system 106 includes a data preparation manager 802, a loss matrix generator 804, a decision tree model manager 806, a user input detector 808, a tree depth manager 810, a digital content manager 812, and a storage manager 814. As shown, the storage manager 814 includes training data 816, loss matrices 818, decision tree machine-learning models 820, audience segments 822, and digital content 824.

As shown, the model segmentation system 106 includes the data preparation manager 802. In various implementations, the data preparation manager 802 facilitates retrieving, identifying, accessing, modifying, transforming, partitioning, deleting, transmitting, and/or storing the training data 816. For example, in one or more implementations, the data preparation manager 802 prepares data for training as described above in connection with at least FIG. 3.

As shown, the model segmentation system 106 includes the loss matrix generator 804. In various implementations, the loss matrix generator 804 facilitates generating, creating, weighing, merging, retrieving, identifying, accessing, modifying, transforming, partitioning, deleting, transmitting, and/ or storing the loss matrices 818, including a customized loss matrix. For example, in many implementations, the loss matrix generator 804 performs the actions of generating a customized loss matrix as described above in connection with at least FIG. 4A-4B.

As shown, the model segmentation system 106 includes the decision tree model manager 806. In various implementations, the decision tree model manager 806 facilitates generating, retrieving, identifying, accessing, modifying, implementing, transmitting, and/or storing decision tree machine-learning models 820. For example, in one or more implementations, the decision tree model manager 806 generates one or more multi-class decision tree machine-learning models from a customized loss matrix and/or target tree depth, as described above. Further, as detailed above, the decision tree model manager 806 generates multi-class decision tree machine-learning models that include classification criteria for multiple audience segments 822.

In some implementations, the decision tree model manager 806 performs the acts of finalizing model training as described above in connection with at least FIG. 6. In some implementations, the decision tree model manager 806 utilizes another type of machine-learning model, such as random forest machine-learning models and/or gradient boosting machine-learning models.

As shown, the model segmentation system 106 includes the user input detector 808. In various implementations, the user input detector 808 facilitates detecting, receiving, and/ or identifying user input on the computing device 800. In some instances, the user input detector 808 detects one or more user interactions (e.g., a single interaction, or a combination of interactions) with respect to a digital image in a graphical user interface. For example, the user input detector 808 detects a user interaction from a keyboard, mouse, touchpad, touchscreen, and/or any other input device in connection with the computing device 800. For instance, the user input detector 808 detects user input with respect to a location selection along a regression mapping when generating a customized loss matrix, as described above with respect to at least FIGS. 4A-4C.

As shown, the model segmentation system 106 includes the tree depth manager 810. In various implementations, the tree depth manager 810 facilitates searching, generating, identifying, modifying, transmitting, and/or storing tree depths of a decision tree model. For example, in a number of implementations, the tree depth manager 810 determines a tree depth as described above in connection with at least FIG. 5.

As mentioned above, the model segmentation system 106 includes the digital content manager 812. In various embodiments, the digital content manager 812 facilitates the retrieval, identification, access, modification, removal, deletion, transmission, and/or storage of digital content items, such as images, text, and/or links including promotional material. In some implementations, the digital content manager 812 provides digital content 824 to a client device based on the client device being classified to a target audience segment.

Each of the components 802-824 of the model segmentation system 106 may include software, hardware, or both. For example, the components 802-824 may include one or more instructions stored on a computer-readable storage medium and executable by processors of one or more computing devices, such as a client device (e.g., a mobile client device) or server device. When executed by the processors, the computer-executable instructions of the model segmentation system 106 may cause a computing device to perform the feature learning methods described herein. Alternatively, the components 802-824 may include hardware, such as a special-purpose processing device to perform a certain function or group of functions. In addition, the components 802-824 of the model segmentation system 106 may include a combination of computer-executable instructions and hardware.

Furthermore, the components 802-824 of the model segmentation system 106 may be implemented as one or more operating systems, as one or more stand-alone applications, as one or more modules of an application, as one or more plug-ins, as one or more library functions or functions that may be called by other applications, and/or as a cloud-computing model. Thus, the components 802-824 may be implemented as a stand-alone application, such as a desktop or mobile application. Additionally, the components 802-824 may be implemented as one or more web-based applications hosted on a remote server. The components 802-824 may also be implemented in a suite of mobile device applications or "apps." To illustrate, the components 802-824 may be implemented in an application, including but not limited to ADOBE® EXPERIENCE CLOUD, CREATIVE CLOUD®, ADOBE® ANALYTICS CLOUD, ADOBE® AUDIENCE MANAGER or other digital content applications or software packages. The foregoing are either registered trademarks or trademarks of Adobe Inc. in the United States and/or other countries.

FIGS. 1-8, the corresponding text, and the examples provide several different methods, systems, devices, and non-transitory computer-readable media of the model segmentation system 106. In addition to the foregoing, one or more implementations may also be described in terms of flowcharts comprising acts for accomplishing a particular result, such as the flowcharts of acts shown in FIG. 9. Additionally, the acts described herein may be repeated or performed in parallel with one another or parallel with different instances of the same or similar acts.

Figure 9:
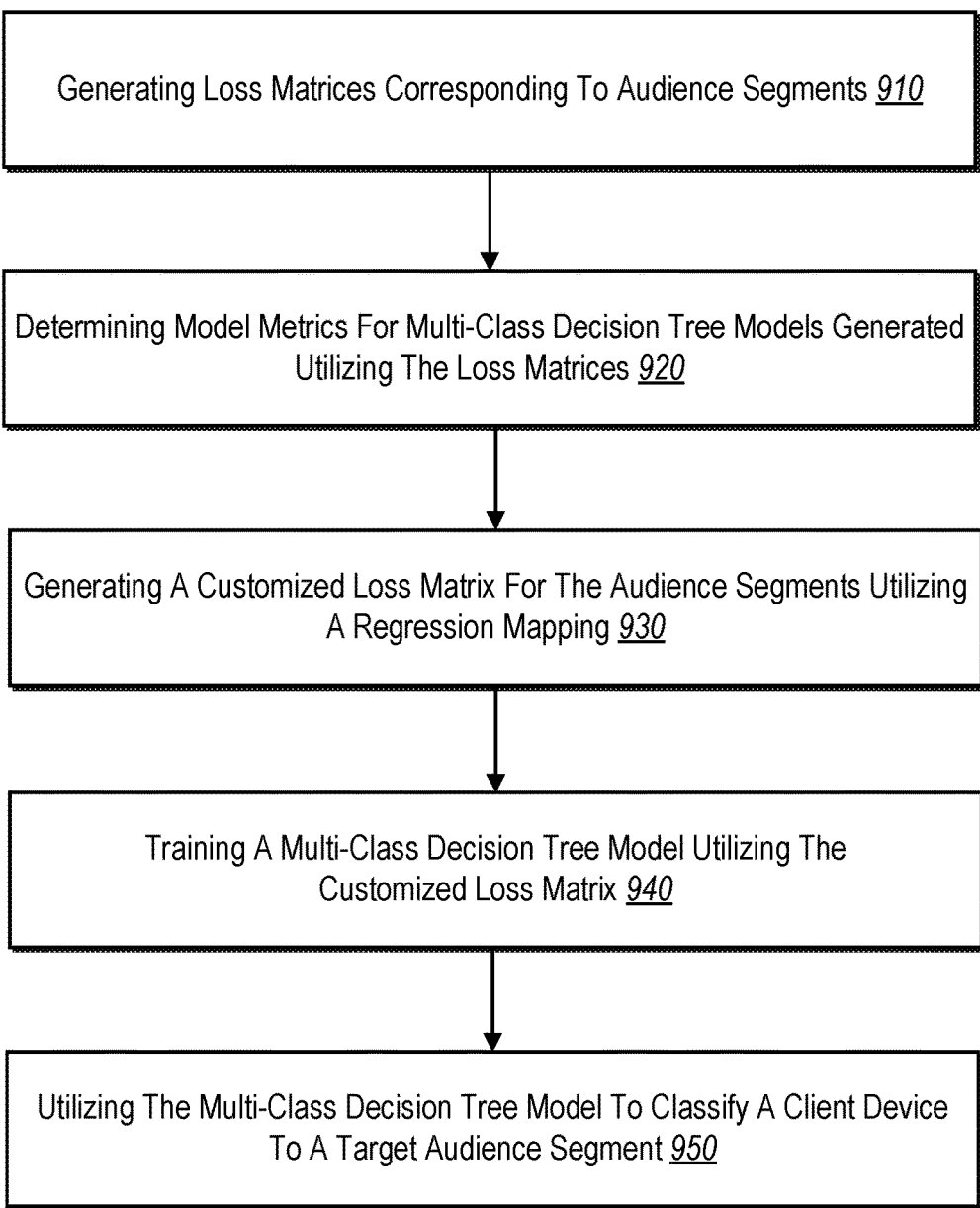
FIG. 9 illustrates a flowchart of a series of acts for generating multi-class decision tree machine-learning models in accordance with one or more implementations.

As mentioned previously, FIG. 9 illustrates a flowchart of a series of acts 900 of generating multi-class decision tree machine-learning models in accordance with one or more implementations. While FIG. 9 illustrates acts according to one implementation, alternative implementations may omit, add to, reorder, and/or modify any of the acts shown in FIG. 9. The acts of FIG. 9 may be performed as part of a method. Alternatively, a non-transitory computer-readable medium may comprise instructions that, when executed by one or more processors, cause a computing device to perform the acts of FIG. 9. In some implementations, a system may perform the acts of FIG. 9.

In one or more implementations, the series of acts 900 is implemented on one or more computing devices, such as the server device 102, the client device 108, the administrator devices 114, 430, or the computing device 800. In addition, in some implementations, the series of acts 900 is implemented in a digital medium environment for generating and segmenting digital audiences. For example, the series of acts 900 is implemented on a computing device having memory that includes learning data and a plurality of loss matrices for a target audience segment of a plurality of audience segments.

The series of acts 900 includes an act 910 of generating loss matrices corresponding to audience segments. In particular, the act 910 may involve generating a plurality of loss matrices including penalty values for audience segment misclassifications corresponding to a plurality of audience segments. In one or more implementations, the act 910 includes generating a plurality of loss matrices for each audience segment of the plurality of audience segments. In alternative implementations, the act 910 includes generating a plurality of loss matrices for the plurality of audience segments.

As shown, the series of acts 900 also includes an act 920 of determining model metrics for multi-class decision tree models generated utilizing the loss matrices. In particular, the act 920 may involve determining model evaluation metrics for a plurality of multi-class decision tree machine-learning models generated utilizing the plurality of loss matrices. In one or more implementations, the act 920 includes determining model evaluation metrics for a target audience segment based on a plurality of multi-class decision tree machine-learning models generated utilizing a plurality of loss matrices and the learning data (i.e., training data).

In various implementations, the act 920 includes generating confusion matrices that indicate predicted classifications and actual classifications for the plurality of audience segments for each of the plurality of multi-class decision tree machine-learning models generated utilizing the plurality of loss matrices. In some implementations, the act 920 includes determining the model evaluation metrics for the target audience segment of the plurality of audience segments by determining accuracy scores and reach scores for the target audience segment based on the confusion matrices.

As shown, the series of acts 900 also includes an act 930 of generating a customized loss matrix for the audience segments utilizing a regression mapping. In particular, the act 930 may involve generating a customized loss matrix for the plurality of audience segments utilizing a regression mapping of the model evaluation metrics and the plurality of loss matrices. In one or more implementations, the act 930 includes generating a regression mapping for the target audience segment based on the model evaluation metrics for the plurality of multi-class decision tree machine-learning models.

In various implementations, the act 930 includes generating a customized loss matrix from the plurality of loss matrices based on receiving a location selection on the regression mapping within an interactive graphical user interface provided for display on a client device. In example implementations, the act 930 includes identifying a location selection for the target audience segment on the linear regression mapping based on user input. In some implementations, the act 930 includes generating the regression mapping as a linear regression line based on the model evaluation metrics. In various implementations, the act 930 includes generating the customized loss matrix by associating each audience segment of the plurality of audience segments with a separate row and a separate column of the customized loss matrix.

In example implementations, the act 930 includes generating the customized loss matrix from the plurality of loss matrices by detecting an upper-boundary multi-class decision tree machine-learning model and a lower-boundary multi-class decision tree machine-learning model based on the location selection on the regression line, determining an upper-boundary coefficient based on the location selection on the regression line and an upper-boundary loss matrix of the plurality of loss matrices utilized to generate the upper-boundary multi-class decision tree machine-learning model, and determining a lower-boundary coefficient based on the location selection on the regression line and a lower-boundary loss matrix of the plurality of loss matrices utilized to generate the lower-boundary multi-class decision tree machine-learning model.

In some implementations, the act 930 includes generating the customized loss matrix from the plurality of loss matrices by generating an initial set of values of the customized loss matrix based on the upper-boundary coefficient, the upper-boundary loss matrix, the lower-boundary coefficient, and the lower-boundary loss matrix. In one or more implementations, the act 930 includes generating the customized loss matrix from the plurality of loss matrices by modifying an additional set of values in the customized loss matrix based on the upper-boundary coefficient, the upper-boundary loss matrix, the lower-boundary coefficient, the lower-boundary loss matrix, and the initial set of values of the customized loss matrix.

As shown, the series of acts 900 also includes an act 940 of training a multi-class decision tree model utilizing the customized loss matrix. In particular, the act 940 may involve generating a finalized multi-class decision tree machine-learning model utilizing the customized loss matrix. In one or more implementations, the act 940 includes generating a multi-class decision tree machine-learning model utilizing the customized loss matrix for the target audience segment to classify traits of client devices into separate classes of a plurality of classes.

As shown, the series of acts 900 also includes an act 950 of utilizing the multi-class decision tree model to classify a client device to a target audience segment. In particular, the act 950 may involve utilizing the finalized multi-class decision tree machine-learning model to classify the client device to a target audience segment of the plurality of audience segments in response to determining one or more traits of a client device. In one or more implementations, the act 950 includes generating the target audience segment based on the accuracy score and the reach score for the target audience segment. In various implementations, the act 950 includes classifying the client device to a target audience segment by determining a recency rule and a frequency rule of the target audience segment from the multi-class decision tree machine-learning model and classifying the client device to the target audience segment by comparing the one or more traits of the client device to the recency rule and the frequency rule of the target audience segment.

The series of acts 900 may include various additional acts. For example, the series of acts 900 may include acts of generating the customized loss matrix for the plurality of audience segments by generating a separate linear regression mapping for each audience segment of the plurality of audience segments, receiving separate location selections on the separate linear regression mappings for each audience segment of the plurality of audience segments, and generating the customized loss matrix based on each of the separate location selections on the separate linear regression mappings for each audience segment of the plurality of audience segments.

In some implementations, the series of acts 900 includes the acts of generating a set of multi-class decision tree machine-learning models based on a plurality of tree depth values and generating a set of accuracy scores for the set of multi-class decision tree machine-learning models. In various implementations, the series of acts 900 also includes the acts of selecting a target tree depth based on the set of accuracy and reach scores and generating the finalized multi-class decision tree machine-learning model utilizing the customized loss matrix and the target tree depth. In example implementations, the series of acts 900 also includes the acts of determining an overfitting score for each of the set of multi-class decision tree machine-learning models by comparing accuracy scores between each of the set of multi-class decision tree machine-learning models and a multi-class decision tree machine-learning model generated utilizing the customized loss matrix and selecting the target tree depth based on the overfitting scores.

In various implementations, the series of acts 900 includes the act of generating the learning data by identifying class ratios for each class segment in the learning data, determining that a minority class segment of the class segments is below an upper-class ratio threshold, and downscaling samples in a majority class segment until the minority class segment satisfies a balanced ratio threshold. In some implementations, the series of acts 900 includes the act of generating the learning data by identifying class ratios for each class segments in the learning data, determining that a minority class segment of the class segments is below a lower-class ratio threshold, and upscaling samples in the minority class segment until the minority class segment satisfies a balanced ratio threshold.

In example implementations, the series of acts 900 includes the act of providing digital content corresponding to the target audience segment to the client device. In one or more implementations, the series of acts 900 includes the act of classifying the client device to the target audience segment by determining a recency rule and a frequency rule for each of the audience segments from the multi-class decision tree machine-learning model, classifying a first client device to a first audience segment by comparing the traits of the first client device to the recency rules and the frequency rules of the audience segments, and classifying a second client device to a second audience segment by comparing the traits of the second client device to the recency rules and the frequency rules of the audience segments.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the model segmentation system to generate and utilize multi-class decision tree machine-learning models, as described herein.

Implementations of the present disclosure may comprise or utilize a special-purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

The computer-readable media may be any available media that is accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure may comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media may include a network and/or data links that are used to carry desired program code means in the form of computer-executable instructions or data structures and that are accessed by a general-purpose or special-purpose computer. Combinations of the above should also be included within the scope of computer-readable media.

Further, upon reaching various computer system components, program code means in the form of computer-executable instructions or data structures may be transferred automatically from transmission media to non-transitory computer-readable storage media (devices) (or vice versa). For example, computer-executable instructions or data structures received over a network or data link may be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) may be included in computer system components that also (or even primarily) utilize transmission media.

Computer-executable instructions comprise, for example, instructions and data which, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure may also be implemented in cloud computing environments. As used herein, the term "cloud computing" refers to a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud-computing model may be composed of various characteristics such as, for example, on-demand self-service, broad network access, resource pooling, rapid elasticity, measured service, and so forth. A cloud-computing model may also expose various service models, such as, for example, Software as a Service ("SaaS"), Platform as a Service ("PaaS"), and Infrastructure as a Service ("IaaS"). A cloud-computing model may also be deployed using different deployment models such as private cloud, community cloud, public cloud, hybrid cloud, and so forth. In addition, as used herein, the term "cloud-computing environment" refers to an environment in which cloud computing is employed.

Figure 10:
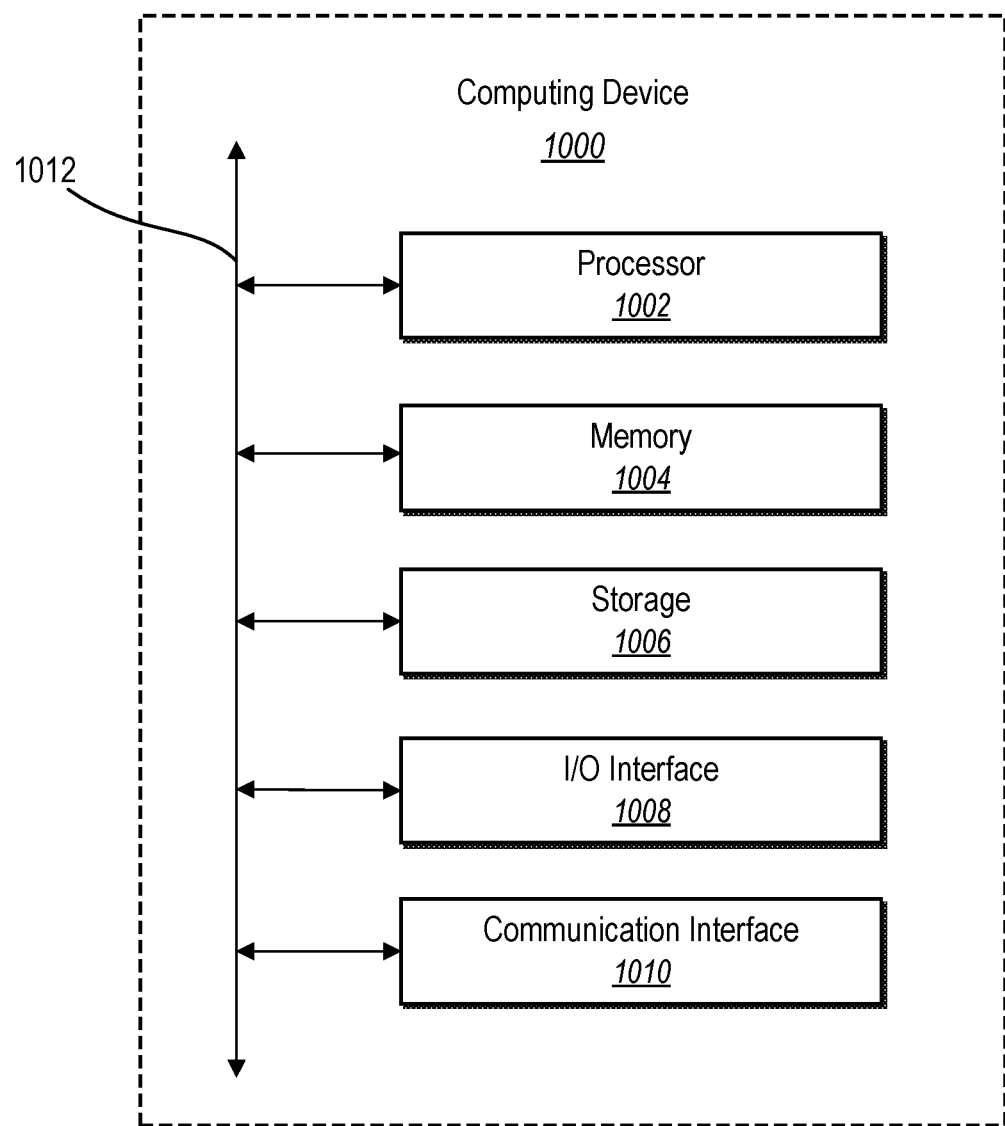
FIG. 10 illustrates a block diagram of an example computing device for implementing one or more implementations of the present disclosure.

FIG. 10 illustrates a block diagram of an example computing device 1000 that may be configured to perform one or more of the processes described above. One will appreciate that one or more computing devices, such as server device 102, the client device 108, the administrator devices 114, 430, or the computing device 800. In one or more implementations, the computing device 1000 may be a non-mobile device (e.g., a desktop computer, a server device, a web server, a file server, a social networking system, a program server, an application store, or a content provider). Further, the computing device 1000 may be a server device that includes cloud-based processing and storage capabilities. In some implementations, the computing device 1000 may be a mobile device (e.g., a laptop, a tablet, a smartphone, a mobile telephone, a camera, a tracker, a watch, a wearable device, etc.).

As shown in FIG. 10, the computing device 1000 may include one or more processor(s) 1002, memory 1004, a storage device 1006, input/output ("I/O") interfaces 1008, and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other implementations. Furthermore, in certain implementations, the computing device 1000 includes fewer components than those shown in FIG. 10. Components of the computing device 1000 shown in FIG. 10 will now be described in additional detail.

In particular implementations, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 may include a non-transitory storage medium described above. The storage device 1006 may include a hard disk drive (HDD), flash memory, a Universal Serial Bus (USB) drive, or a combination of these or other storage devices.

As shown, the computing device 1000 includes one or more I/O interfaces 1008, which are provided to allow a user to provide input to (e.g., user strokes), receive output from, and otherwise transfer data to and from the computing device 1000. These I/O interfaces 1008 may include a mouse, keypad or a keyboard, a touch screen, camera, optical scanner, network interface, modem, other known I/O devices, or a combination of these I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1008 are configured to provide graphical data to a display for presentation to a user. The graphical data may be representative of one or more graphical user interfaces and/or any other graphical content as may serve a particular implementation.

The computing device 1000 may further include a communication interface 1010. The communication interface 1010 may include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 may further include a bus 1012. The bus 1012 may include hardware, software, or both that connects components of computing device 1000 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computer device to:
    generate a plurality of loss matrices comprising penalty values for audience segment misclassifications corresponding to a plurality of audience segments;
    determine, based on confusion matrices that indicate predicted classification and actual classifications for the plurality of audience segments, model evaluation metrics for a plurality of multi-class decision tree machine-learning models generated utilizing the plurality of loss matrices;
    generate a customized loss matrix for the plurality of audience segments utilizing a regression mapping of the model evaluation metrics and the plurality of loss matrices;
    generate a finalized multi-class decision tree machine-learning model utilizing the customized loss matrix; and
    in response to determining one or more traits of a client device, utilize the finalized multi-class decision tree machine-learning model to classify the client device to a target audience segment of the plurality of audience segments.

2. The non-transitory computer-readable medium of claim 1, further comprising instructions that, when executed by the at least one processor, cause the computer device to generate the confusion matrices for each of the plurality of multi-class decision tree machine-learning models generated utilizing the plurality of loss matrices.

3. The non-transitory computer-readable medium of claim 2, further comprising instructions that, when executed by the at least one processor, cause the computer device to determine the model evaluation metrics for the target audience segment of the plurality of audience segments by determining accuracy scores and reach scores for the target audience segment based on the confusion matrices.

4. The non-transitory computer-readable medium of claim 3, further comprising instructions that, when executed by the at least one processor, cause the computer device to:
    generate the regression mapping as a linear regression line based on the model evaluation metrics; and
    generate the target audience segment based on the accuracy scores and the reach scores for the target audience segment.

5. The non-transitory computer-readable medium of claim 4, further comprising instructions that, when executed by the at least one processor, cause the computer device to identify a location selection for the target audience segment on the linear regression line based on user input.

6. The non-transitory computer-readable medium of claim 5, further comprising instructions that, when executed by the at least one processor, cause the computer device to generate the customized loss matrix for the plurality of audience segments by:
    generating a separate linear regression line for each audience segment of the plurality of audience segments;
    receiving separate location selections on the separate linear regression lines for each audience segment of the plurality of audience segments; and
    generating the customized loss matrix based on each of the separate location selections on the separate linear regression lines for each audience segment of the plurality of audience segments.

7. The non-transitory computer-readable medium of claim 1, further comprising instructions that, when executed by the at least one processor, cause the computer device to classify the client device to a target audience segment by:
    determining a recency rule and a frequency rule of the target audience segment from the finalized multi-class decision tree machine-learning model; and
    classifying the client device to the target audience segment by comparing the one or more traits of the client device to the recency rule and the frequency rule of the target audience segment.

8. The non-transitory computer-readable medium of claim 1, further comprising instructions that, when executed by the at least one processor, cause the computer device to:
    generate a set of multi-class decision tree machine-learning models based on a plurality of tree depth values; and generate a set of accuracy and reach scores for the set of multi-class decision tree machine-learning models.

9. The non-transitory computer-readable medium of claim 8, further comprising instructions that, when executed by the at least one processor, cause the computer device to:
select a target tree depth based on the set of accuracy and reach scores; and
generate the finalized multi-class decision tree machine-learning model utilizing the customized loss matrix and the target tree depth.

10. The non-transitory computer-readable medium of claim 9, further comprising instructions that, when executed by the at least one processor, cause the computer device to:
determine an overfitting score for each of the set of multi-class decision tree machine-learning models by comparing accuracy scores between each of the set of multi-class decision tree machine-learning models and a multi-class decision tree machine-learning model generated utilizing the customized loss matrix; and
select the target tree depth based on the overfitting scores.

11. A system for generating multi-class decision tree machine-learning models, the system comprising:
one or more memory devices; and
at least one server device configured to cause the system to:
generate a plurality of loss matrices comprising penalty values for audience segment misclassifications corresponding to a plurality of audience segments;
determine, based on confusion matrices that indicate predicted classification and actual classifications for the plurality of audience segments, model evaluation metrics for a plurality of multi-class decision tree machine-learning models generated utilizing the plurality of loss matrices;
generate a customized loss matrix for the plurality of audience segments utilizing a regression mapping of the model evaluation metrics and the plurality of loss matrices;
generate a finalized multi-class decision tree machine-learning model utilizing the customized loss matrix; and
in response to determining one or more traits of a client device, utilize the finalized multi-class decision tree machine-learning model to classify the client device to a target audience segment of the plurality of audience segments.

12. The system of claim 11, wherein the at least one server device is further configured to cause the system to generate the customized matrix based on receiving a location selection on the regressing mapping within an interactive graphical user interface provided for display om a client device.

13. The system of claim 12, wherein the at least one server device is further configured to cause the system to generate the customized loss matrix from the plurality of loss matrices by:
detecting an upper-boundary multi-class decision tree machine-learning model and a lower-boundary multi-class decision tree machine-learning model based on the location selection on the regression mapping;
determining an upper-boundary coefficient based on the location selection on the regression mapping and an upper-boundary loss matrix of the plurality of loss matrices utilized to generate the upper-boundary multi-class decision tree machine-learning model; and
determining a lower-boundary coefficient based on the location selection on the regression mapping and a lower-boundary loss matrix of the plurality of loss matrices utilized to generate the lower-boundary multi-class decision tree machine-learning model.

14. The system of claim 13, wherein the at least one server device is further configured to cause the system to generate the customized loss matrix from the plurality of loss matrices by generating an initial set of values of the customized loss matrix based on the upper-boundary coefficient, the upper-boundary loss matrix, the lower-boundary coefficient, and the lower-boundary loss matrix.

15. The system of claim 14, wherein the at least one server device is further configured to cause the system to generate the customized loss matrix from the plurality of loss matrices by modifying an additional set of values in the customized loss matrix based on the upper-boundary coefficient, the upper-boundary loss matrix, the lower-boundary coefficient, the lower-boundary loss matrix, and the initial set of values of the customized loss matrix.

16. The system of claim 11, wherein the at least one server device is further configured to cause the system to:
generate the plurality of multi-class decision tree machine-learning models utilizing the plurality of loss matrices and learning data comprising class segments; and
generate the learning data by:
identifying class ratios for each class segment in the learning data;
determining that a minority class segment of the class segments is below an upper-class ratio threshold; and
downscaling samples in a majority class segment until the minority class segment satisfies a balanced ratio threshold.

17. The system of claim 11, wherein the at least one server device is further configured to cause the system to,
generate the plurality of multi-class decision tree machine-learning models utilizing the plurality of loss matrices and learning data comprising class segments; and
generate the learning data by:
identifying class ratios for each class segment in the learning data;
determining that a minority class segment of the class segments is below a lower-class ratio threshold; and
upscaling samples in the minority class segment until the minority class segment satisfies a balanced ratio threshold.

18. In a digital medium environment for segmenting digital audiences, a computer-implemented method of generating multi-class decision tree machine-learning models, the computer-implemented method comprising:
generating a plurality of loss matrices comprising penalty values audience segment misclassifications corresponding to a plurality of audience segments;
determine, based on confusion matrices that indicate predicted classification and actual classifications for the plurality of audience segments model evaluation metrics for a plurality of multi-class decision tree machine-learning models generated utilizing the plurality of loss matrices;
generate a customized loss matrix for the plurality of audience segments utilizing a regression mapping of the model evaluation metrics and the plurality of loss matrices;
generate a finalized multi-class decision tree machine-learning model utilizing the customized loss matrix; and
in response to determining one or more traits of a client device, utilize the finalized multi-class decision tree machine-learning model to classify the client device to a target audience segment of the plurality of audience segments.

19. The computer-implemented method of claim 18, further comprising providing digital content corresponding to the target audience segment to the client device.

20. The computer-implemented method of claim 18, further comprising classifying the client device to the target audience segment by:
- determining a recency rule and a frequency rule for each of the plurality of audience segments from the finalized multi-class decision tree machine-learning model;
- classifying a first client device to a first audience segment by comparing traits of the first client device to the recency rules and the frequency rules of the audience segments; and
- classifying a second client device to a second audience segment by comparing the traits of the second client device to the recency rules and the frequency rules of the audience segments.

* * * * *